United States Patent
Chen

(10) Patent No.: US 11,438,453 B2
(45) Date of Patent: Sep. 6, 2022

(54) INCOMING CALL ALERT METHOD AND TERMINAL

(71) Applicant: HUAWEI TECHNOLOGIES CO., LTD., Guangdong (CN)

(72) Inventor: Yi Chen, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/345,036

(22) Filed: Jun. 11, 2021

(65) Prior Publication Data

US 2021/0306450 A1 Sep. 30, 2021

Related U.S. Application Data

(63) Continuation of application No. PCT/CN2019/122233, filed on Nov. 30, 2019.

(30) Foreign Application Priority Data

Dec. 14, 2018 (CN) .......................... 201811534314.4

(51) Int. Cl.
*H04M 1/72484* (2021.01)
*H04M 1/72442* (2021.01)
*H04M 1/72454* (2021.01)

(52) U.S. Cl.
CPC ... *H04M 1/72484* (2021.01); *H04M 1/72442* (2021.01); *H04M 1/72454* (2021.01)

(58) Field of Classification Search
CPC ......... H04M 1/72484; H04M 1/72442; H04M 1/72454; H04M 19/04
See application file for complete search history.

(56) References Cited

U.S. PATENT DOCUMENTS

2003/0086547 A1\* 5/2003 Chuang ................. H04M 1/578
379/142.06
2006/0088281 A1 4/2006 Hasegawa
(Continued)

FOREIGN PATENT DOCUMENTS

| CN | 1658630 A | 8/2005 |
|---|---|---|
| CN | 1972338 A | 5/2007 |

(Continued)

OTHER PUBLICATIONS

Office Action issued in CN 201811534314.4, dated Apr. 13, 2021, 4 pages.

(Continued)

*Primary Examiner* — Farid Seyedvosoghi

(57) ABSTRACT

Embodiments of this application disclose an incoming call alert method and a terminal. The incoming call alert method includes: receiving an incoming call request; and invoking an audio/video player of a system to play audio/video corresponding to the incoming call request. The audio/video player is disposed in a system of the terminal in the embodiments of this application, so that when the terminal receives the incoming call request, the system of the terminal can play the audio/video used for incoming call alert. In this way, the terminal can alert a user by playing the audio/video without occupying additional system resources. In addition, an animation of the video and a caller ID display interface that are displayed by the terminal are integrated in terms of a visual effect, thereby improving use experience of the user.

15 Claims, 20 Drawing Sheets

(56) References Cited

U.S. PATENT DOCUMENTS

| | | | | |
|---|---|---|---|---|
| 2007/0140448 A1* | 6/2007 | Lin | ..................... | H04M 7/0033 |
| | | | | 379/93.17 |
| 2009/0029736 A1* | 1/2009 | Kim | ..................... | H04W 8/183 |
| | | | | 455/558 |
| 2012/0094718 A1* | 4/2012 | Kim | .................. | H04M 1/72484 |
| | | | | 455/559 |

FOREIGN PATENT DOCUMENTS

| | | |
|---|---|---|
| CN | 101035164 A | 9/2007 |
| CN | 101090539 A | 12/2007 |
| CN | 101119519 A | 2/2008 |
| CN | 105847572 A | 8/2016 |
| CN | 106412347 A | 2/2017 |
| CN | 109743442 A | 5/2019 |
| WO | 2005062587 A1 | 7/2005 |

OTHER PUBLICATIONS

International Search Report and Written Opinion issued in PCT/CN2019/122233, dated Feb. 26, 2020, 9 pages.

* cited by examiner

INCOMING CALL ALERT METHOD AND TERMINAL

CROSS-REFERENCE TO RELATED APPLICATIONS

This application is a continuation of International Application No. PCT/CN2019/122233, filed on Nov. 30, 2019, which claims priority to Chinese Patent Application No. 201811534314.4, filed on Dec. 14, 2018. The disclosures of the aforementioned applications are hereby incorporated by reference in their entireties.

TECHNICAL FIELD

Embodiments of this application relate to the terminal field, and in particular, to an incoming call alert method and a terminal.

BACKGROUND

An instant messaging (IM) terminal supports instant voice messaging and/or instant video messaging. A first terminal may initiate an instant messaging request to a second terminal, and the first terminal may also receive an instant messaging request sent by the second terminal. The instant messaging request received by the first terminal may also be referred to as an incoming call request. The first terminal and the second terminal are terminals capable of performing instant messaging with each other.

Usually, in response to the incoming call request, the first terminal alerts a user to a communication request by playing audio. In response to an acceptance operation instruction or a reject operation instruction entered by the user, the first terminal stops playing the audio. An alert manner by playing audio is relatively monotonous, and consequently, use experience of the user is undesirable.

SUMMARY

Embodiments of this application provide an incoming call alert method and a terminal, to resolve a prior-art problem that an incoming call alert manner is monotonous.

According to a first aspect, an embodiment of this application provides an incoming call alert method, where the method includes:

receiving an incoming call request; and invoking an audio/video player of a system to play audio/video corresponding to the incoming call request.

In this implementation, the audio/video player is predisposed in the system of a terminal. Based on this, in response to the received incoming call request, the terminal may alert a user by playing the audio/video by using the audio/video player of the terminal. It can be learnt that, by using this implementation, the terminal can alert the user by playing the audio/video without occupying additional system resources, and conveniently maintain a correspondence between the audio and the video.

In an optional implementation, after the receiving an incoming call request, the method further includes:

displaying a caller ID display interface and an animation of the audio/video, where the animation of the audio/video is used as a background of the caller ID display interface.

In this implementation, the terminal may integrate an image of the video with the caller ID display interface, so that the caller ID display interface and the video are integrated in terms of a visual effect. For example, the terminal embeds the image of the video into a bottom layer of the caller ID display interface. In this way, the video and the caller ID display interface that are displayed by the terminal are integrated in terms of a visual effect, thereby improving use experience of the user.

In an optional implementation, before the receiving an incoming call request, the method further includes:

receiving a storage instruction entered by the user; and storing a target audio/video file indicated by the storage instruction.

Before the incoming call request is received, the terminal prestores at least one audio/video file. In this implementation, in response to a user operation, the terminal may locally store an audio/video file that is made or selected by the user, to prepare for audio/video playing upon an incoming call.

In an optional implementation, before the receiving a storage instruction entered by the user, the method further includes:

receiving an extension instruction entered by the user; and displaying a control menu in response to the extension instruction, where the control menu includes a control corresponding to the storage instruction.

In an optional implementation, the storing a target audio/video file indicated by the storage instruction includes:

obtaining, from the storage instruction, an address of the target audio/video file in a server, where the server is a server of an application (APP) for playing the target audio/video;

obtaining the target audio/video file based on the address; and storing the target audio/video file locally.

In an optional implementation, the storing the target audio/video file locally includes:

storing the target audio/video file in a system memory; or storing the target audio/video file in a cache memory of the APP.

In this implementation, when the user uses a third-party APP (for example, TikTok™) installed in the terminal to play audio/video, the audio/video played by using the third-party APP may be stored. By using this implementation, the solution is more user-friendly, further improving user experience.

In an optional implementation, before the receiving an incoming call request, the method further includes:

receiving a first setting instruction entered by the user, where the first setting instruction includes first contact information, the contact information includes a contact identifier and a contact group identifier, and the contact group identifier indicates a set including at least two contact identifiers;

displaying an audio/video file name list;

receiving a first selection instruction entered by the user, where the first selection instruction includes a first audio/video file identifier; and establishing a correspondence between the first audio/video file identifier and the first contact information.

In this implementation, the user may select, based on contact information, an audio/video file corresponding to the corresponding contact information. By using this implementation, an operation of establishing a correspondence between contact information and an audio/video file is relatively flexible.

In an optional implementation, before the receiving an incoming call request, the method further includes:

receiving a second setting instruction entered by the user, where the second setting instruction includes a second audio/video file identifier;

displaying a contact information list;

receiving a second selection instruction entered by the user, where the second selection instruction includes second contact information; and establishing a correspondence between the second audio/video file identifier and the second contact information.

In this implementation, the user may select, based on an audio/video file, contact information corresponding to the audio/video file. For example, when browsing through a local video, the user may directly set favorite audio/video as incoming call alert audio/video. By using this implementation, a user operation is more convenient and quicker.

In an optional implementation, before the receiving an incoming call request, the method further includes:

receiving a third setting instruction entered by the user, where the third setting instruction includes an address of a third audio/video file in a server, and the server is a server of an APP for playing the target audio/video;

obtaining the third audio/video file based on the address and determining the third audio/video file identifier;

displaying a contact information list;

receiving a third selection instruction entered by the user, where the third selection instruction includes third contact information; and establishing a correspondence between the third audio/video file identifier and the third contact information.

In this implementation, the user may directly determine audio/video that is being played by using a third-party APP, as audio/video corresponding to contact information. By using this implementation, the user can select diversified audio/video content, and an operation is more flexible.

In an optional implementation, after the receiving an incoming call request and before the invoking an audio/video player of a system to play audio/video corresponding to the incoming call request, the method further includes:

obtaining a contact identifier corresponding to the incoming call request; and determining an audio/video file identifier corresponding to the contact identifier.

The terminal maintains a correspondence between contact information and an audio/video file identifier. After receiving the incoming call request, the terminal can determine, from the correspondence between contact information and an audio/video file identifier based on the contact identifier included in the incoming call request, audio/video corresponding to a corresponding contact.

In an optional implementation, the determining an audio/video file identifier corresponding to the contact identifier includes:

detecting whether the correspondence between contact information and an audio/video file identifier includes the contact identifier; and in response to the correspondence between contact information and an audio/video file identifier including the contact identifier, reading the audio/video file identifier corresponding to the contact identifier; or in response to the correspondence between contact information and an audio/video file identifier not including the contact identifier, obtaining a contact group identifier corresponding to the contact identifier, and reading an audio/video file identifier corresponding to the contact group identifier.

In some embodiments, the audio/video file identifier and the contact identifier are stored in a correspondence. In some other embodiments, the audio/video file identifier and the contact group identifier are stored in a correspondence. In this implementation, the terminal may traverse a storage relationship for a contact identifier. If the contact identifier is found in the storage relationship, a call ringtone processor reads the audio/video file identifier corresponding to the contact identifier. If the contact identifier is not found in the storage relationship, a call ringtone processor obtains the contact group identifier corresponding to the contact identifier, and then reads the audio/video file identifier corresponding to the contact group identifier.

According to a second aspect, an embodiment of this application provides a terminal. The terminal includes modules configured to perform steps of the incoming call alert method in the first aspect and the possible implementations of the first aspect. Specifically, the terminal includes a transceiver module and a processing module, and may further include other modules or units such as a storage module.

According to a third aspect, an embodiment of this application provides a terminal. The terminal includes a processor. The processor is configured to: be coupled to a memory, read an instruction from the memory, and perform the incoming call alert method in the first aspect and the possible implementations of the first aspect according to the instruction.

According to a fourth aspect, an embodiment of this application provides a computer storage medium. The computer storage medium stores an instruction. When the instruction is run on a computer, the computer is enabled to perform some or all steps of the incoming call alert method in the first aspect and the possible implementations of the first aspect.

According to a fifth aspect, an embodiment of this application provides a computer program product. When the computer program product runs on a computer, the computer is enabled to perform some or all steps of the incoming call alert method in the first aspect and the possible implementations of the first aspect.

To resolve the prior-art problem, the audio/video player is disposed in the system of the terminal in the embodiments of this application, so that when the terminal receives the incoming call request, the system of the terminal can play the audio/video used for incoming call alert. In this way, the terminal can alert the user by playing the audio/video without occupying additional system resources. In addition, an animation of the video and the caller ID display interface that are displayed by the terminal are integrated in terms of a visual effect, thereby improving use experience of the user.

BRIEF DESCRIPTION OF DRAWINGS

To describe technical solutions in embodiments of this application more clearly, the following briefly describes the accompanying drawings for describing the example embodiments. Clearly, persons of ordinary skill in the art may derive other drawings from these accompanying drawings without creative efforts.

DESCRIPTION OF EMBODIMENTS

The following clearly describes technical solutions in example embodiments of this application with reference to the accompanying drawings.

It should be understood that, a type of object may be described by using terms such as "first" and "second" in the following embodiments, but the type of object shall not be limited to these terms. These terms are merely used to distinguish between specific objects of the type of object. For example, in the following embodiments, incoming call requests may be described by using the terms such as "first" and "second", but the incoming call requests shall not be limited to these terms. These terms are merely used to distinguish between incoming call requests that are received by the terminal at different moments. In addition, without departing from the scope of the embodiments, a first incoming call request may alternatively be referred to as a second incoming call request. Similarly, a second incoming call request may alternatively be referred to as a first incoming call request. This is the same as another type of object that may be described by using the terms such as "first" and "second" in the following embodiments. Moreover, in description of the following embodiments, "a plurality of" means at least two.

Before the technical solutions in the example embodiments of this application are described, a technical scenario in the embodiments of this application is first described with reference to the accompanying drawings.

The example embodiments of this application are applied to a technical scenario of instant messaging. Instant messaging is implemented by two instant messaging terminals (referred to as terminals for short below). A terminal sending an incoming call request may be referred to as a calling terminal, and a terminal receiving the incoming call request may be referred to as a called terminal. In some embodiments, after receiving the incoming call request, before receiving an operation instruction entered by a user, the called terminal may alert the user to an incoming call by playing audio/video.

Figure 1:
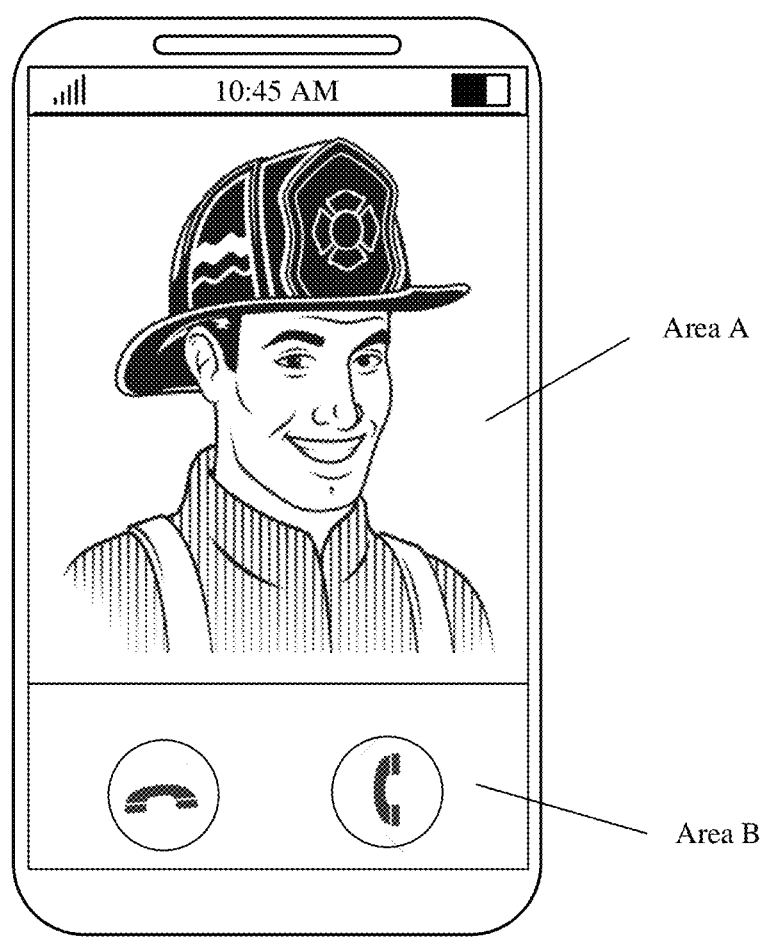
FIG. 1 is a schematic diagram of an interface displayed by a terminal according to an embodiment of this application.

A prior-art incoming call alert method includes: In response to the incoming call request, a built-in ringtone module of a system of the called terminal plays audio corresponding to the incoming call request, and the system invokes a third-party player to play a video corresponding to the incoming call request. A playing area of the video covers at least a part of an area of a caller ID display interface. As shown in FIG. 1, using a smartphone as an example, an incoming call video is played in an area A of an interface of the smartphone, and a part in which a call instruction control is disposed on the caller ID display interface is located in an area B of the interface of the smartphone.

It can be learnt that, to perform the prior-art incoming call alert method, a third-party application program (application, APP) used for video playing needs to be specially disposed in the terminal, occupying a relatively large quantity of resources. In addition, a function module for video playing and a function module for audio playing in the terminal are independent of each other, and consequently a correspondence between audio and a video that are used for incoming call alert is not easily established. Moreover, in an incoming call alert process, a display effect of an interface of the terminal is undesirable, resulting in relatively poor use experience of a user.

In view of this, the embodiments of this application provide the following embodiments of an incoming call alert method and a terminal, to resolve the foregoing problems in the prior-art incoming call alert method that a relatively large quantity of resources is occupied and use experience of a user is relatively poor.

It can be understood that, in a possible implementation of the embodiments of this application, the terminal may be a smartphone in which a subscriber identity module (subscriber identification module, SIM) card is disposed. In another possible implementation of the embodiments of this application, the terminal may be a terminal installed with software or an application program supporting instant voice messaging and/or instant video messaging, such as a tablet computer, a notebook computer, or a wearable device (for example, a smartwatch). The software or application program supporting instant voice messaging and/or instant video messaging is, for example, Facebook™, Skype™, WhatsApp™, Snapchat™, WeChat™ or QQ™ The terminal is used as a called terminal in example embodiments of this application.

In the technical solutions in the embodiments of this application, a user pre-establishes a correspondence between an audio/video file and a contact. In response to an incoming call request of calling the contact, a system of the terminal plays audio/video indicated by the audio/video file, and uses the audio/video as an incoming call audio/video corresponding to the incoming call request. In addition, the terminal can integrate a caller ID display interface with the played video, thereby improving use experience of the user.

The contact includes any contact and a specified contact in a contact group. The contact group is a set including at least two contacts. All contacts belonging to a same contact group include a same group identifier. The contact group may have different representation forms in different scenarios. For example, one SIM card of a smartphone may be considered as one contact group, and all contacts included in the SIM card belong to the contact group. For another example, for instant messaging software QQ™, one buddy group may be considered as one contact group, and all contacts in the buddy group belong to the contact group. In addition, for contacts belonging to one SIM card, some contacts may be categorized as "colleagues", and some other contacts may be categorized as "customers". The "colleagues" group may be used as a contact group, and the "customers" group may be used as another contact group. In the embodiments of this application, a contact group identifier indicates one contact group, and a contact identifier indicates one contact. The contact group identifier and the contact identifier are collectively referred to as contact information in the embodiments of this application.

Based on this, in some embodiments, before delivery of a terminal, the terminal is preconfigured with one or more audio/video files. In some other embodiments, a server of the terminal and/or a network operator may periodically push audio/video to the terminal. The user may locally store the pushed audio/video file depending on a requirement of the user. In still some other embodiments, the user may use the terminal to take audio/video, make audio/video (for example, make a plurality of photos into a slideshow or capture a part of audio/video from a segment of audio/video), and the like. The user may further transmit, to the terminal, an audio/video file stored in another device. In yet some other embodiments, when the user uses a third-party APP (for example, TikTok) installed in the terminal to play audio/video, a download control of the terminal may be triggered to download the watched audio/video.

The following describes storage and setting of an audio/video file in the embodiments of this application from a perspective of a user.

Figure 2:
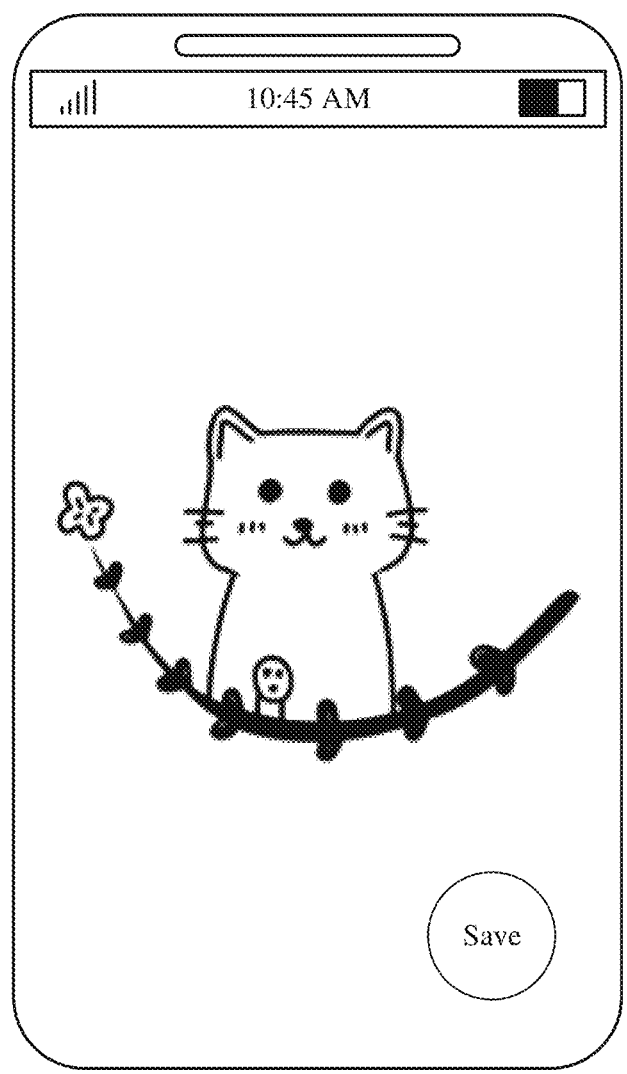
FIG. 2 is a schematic diagram of an interface in a first implementation of a terminal according to an embodiment of this application.

As shown in FIG. 2, for the audio/video pushed by the server of the terminal and/or the network operator to the terminal, the audio/video taken by the user by using the terminal, and the audio/video made by the user on the terminal, the user may trigger a "save" control on an interface of the terminal to store a corresponding audio/video file in the terminal.

It can be understood that the manner in which the user triggers the operation control to store an audio/video file in the terminal is merely an optional implementation in this embodiment of this application, but does not constitute any specific limitation on the trigger manner performed by the user. In some other embodiments, the user may alternatively trigger, by performing a touch and hold operation or by using another gesture instruction, the terminal to store a corresponding audio/video file.

Figure 3:
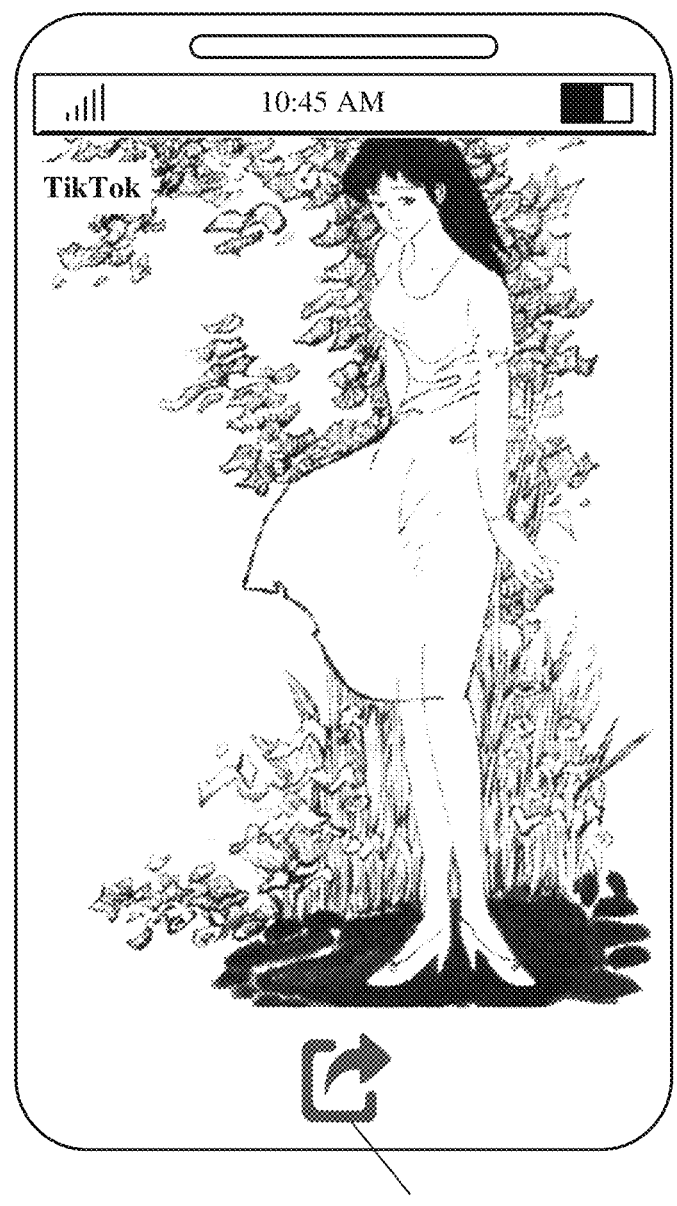
FIG. 3 is a schematic diagram of an interface in a second implementation of a terminal according to an embodiment of this application.
Figure 4:
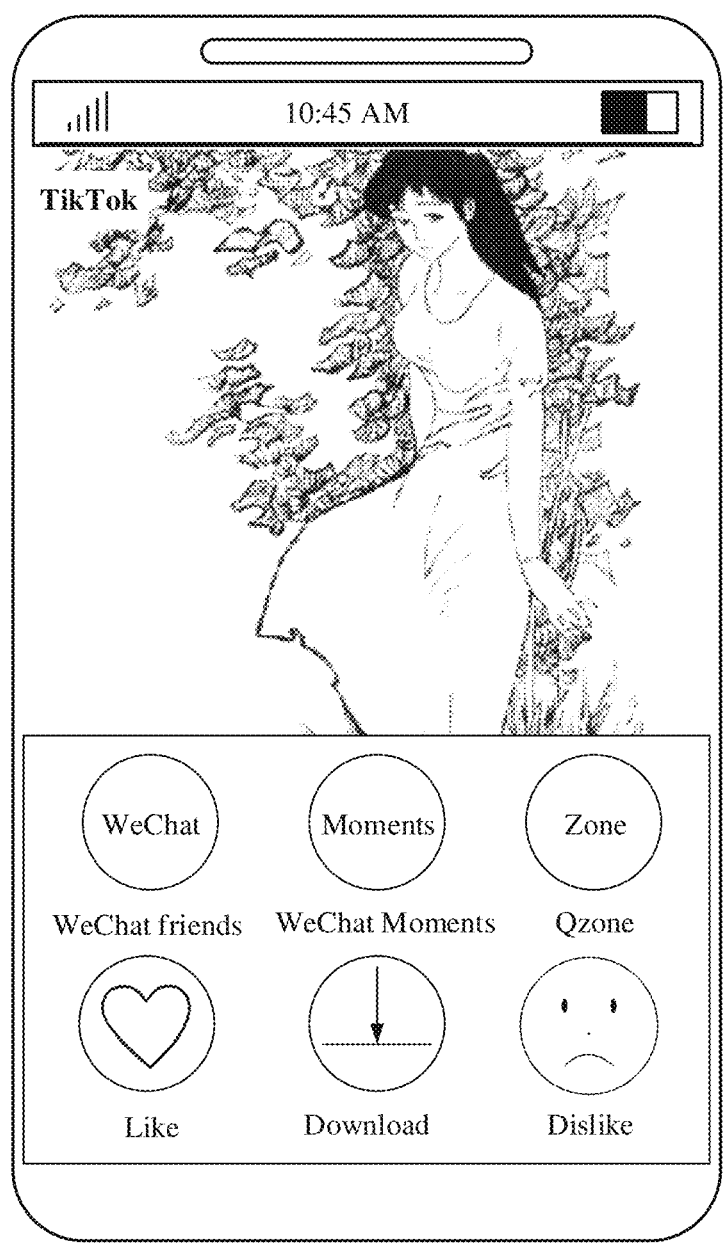
FIG. 4 is a schematic diagram of an interface in another implementation of FIG. 3 according to an embodiment of this application.

As shown in FIG. 3, an extended-operation control window is disposed for a third-party APP installed in a terminal. For example, the extended-operation control window is disposed in an upper right corner of an interface, and is presented in a form of " . . . ". Alternatively, as shown in FIG. 3, the extended-operation control window is disposed in a lower right corner. A user taps the extended-operation control window to obtain a menu of various extended-operation controls shown in FIG. 4. The user may trigger a corresponding control on the menu depending on a requirement, and perform a corresponding operation on audio/video that is being played by using the third-party APP. In this embodiment, the audio/video that is being played by using the third-party APP is, for example, audio/video S. For example, as shown in FIG. 4, the menu may include operation controls such as "share to social APPs", "favorites", "like", "replicate links", "download", and "dislike". The user triggers the "like" control in FIG. 4, and then a quantity of "like" of the audio/video S is increased by 1. Likewise, the user triggers the "download" control in FIG. 4, and then the audio/video S is downloaded and stored in the terminal.

It can be understood that the implementation of triggering the terminal to store an audio/video file is merely an example for description, and does not constitute any limitation on the implementation of triggering the terminal to store an audio/video file. In some other embodiments, the user may use a manner different from the foregoing embodiment to trigger the terminal to store an audio/video file.

Further, in some embodiments, before delivery of the terminal, audio/video included in any audio/video file prestored in the terminal may be set as default incoming call alert audio/video of the terminal. In this embodiment, in response to an incoming all request corresponding to any contact, the terminal may play the default audio/video. For example, before delivery, the terminal prestores an audio/video file 1, an audio/video file 2, an audio/video file 3, an audio/video file 4, and an audio/video file 5. The audio/video file 1 is set as the default incoming call alert audio/video of the terminal. In this way, the terminal plays the audio/video indicated by the audio/video file 1, when receiving an incoming call request. In some other embodiments, the user may set an audio/video file corresponding to a contact group. After the audio/video file corresponding to the contact group is set, an incoming call request corresponding to any contact in the contact group can trigger the terminal to play audio/video indicated by the corresponding audio/video file. In still some other embodiments, the user may alternatively set an audio/video file corresponding to a specified contact.

The following uses a smartphone as an example to describe, from a perspective of a user, establishment of a correspondence between contact information and an audio/video file.

One SIM card is used as one contact group, and an implementation process of establishing a correspondence between a contact group and an audio/video file by the user is as follows: As shown in FIG. 5A to FIG. 5D, the user triggers a setting control, so that the terminal displays an interface shown in FIG. 5A. The interface shown in FIG. 5A includes various setting item controls. The setting item controls include a mobile phone number corresponding to a SIM card, an incoming call ringtone option control of the SIM card, and the like. The user triggers the incoming call ringtone option control, so that the terminal displays an interface shown in FIG. 5B. The interface shown in FIG. 5B includes a ringtone selection control. FIG. 5B shows an image of audio/video that is currently corresponding to the SIM card. Then, the user triggers a video ringtone control shown in FIG. 5B, so that the terminal displays a name list of a series of audio/video files shown in FIG. 5C. Further, the user selects one audio/video file from the list in FIG. 5C, where audio/video corresponding to the audio/video file is used as audio/video that is subsequently corresponding to the SIM card. FIG. 5D shows an image of the audio/video that is subsequently corresponding to the SIM card.

Figure 5A:
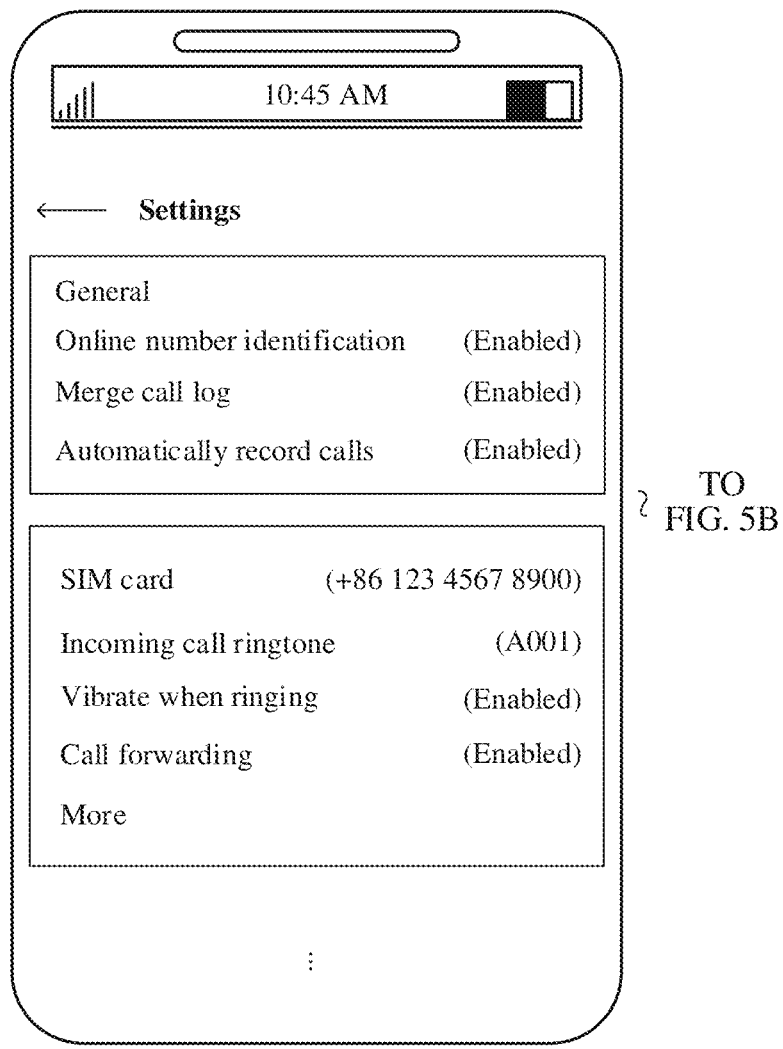
FIG. 5A to FIG. 5D are a schematic diagram of an interface in a first implementation of a smartphone according to an embodiment of this application.
Figure 5B:
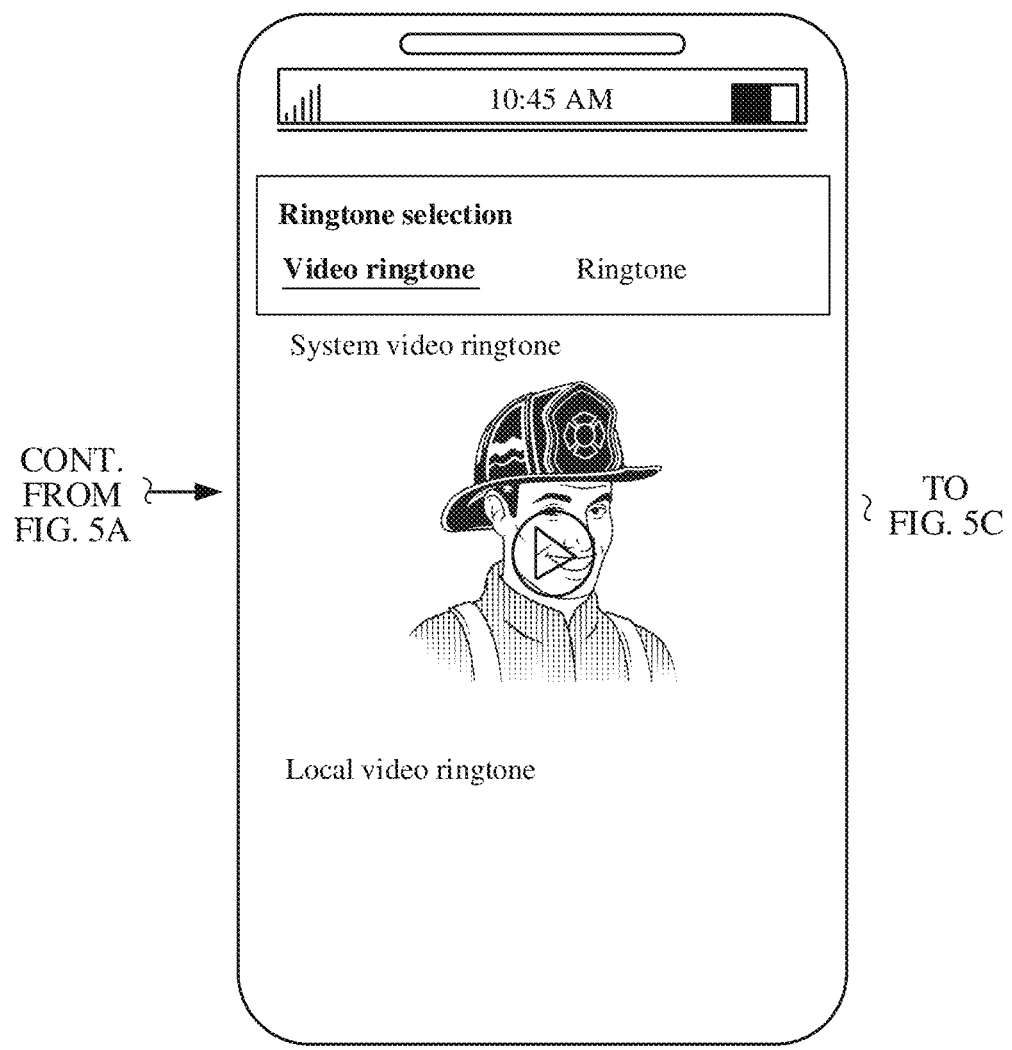
Figure 5C:
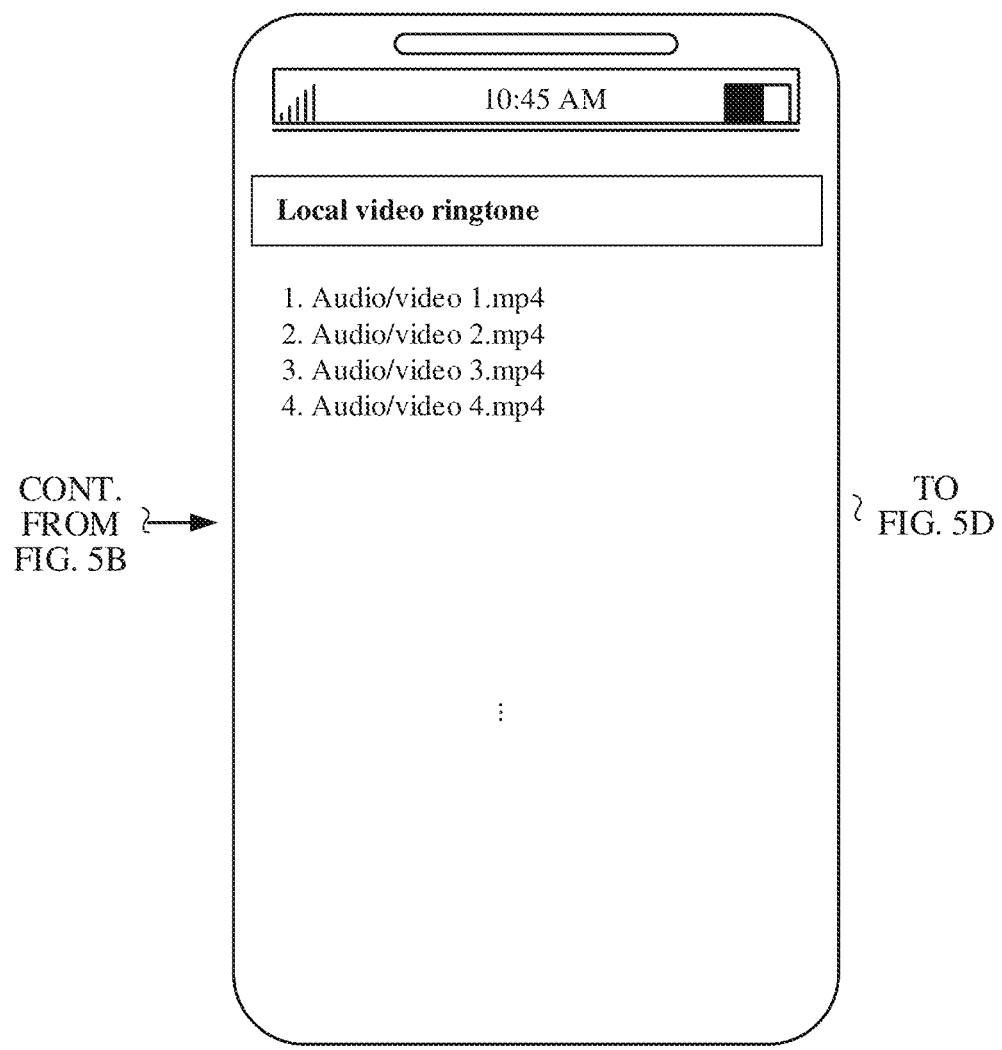
Figure 5D:
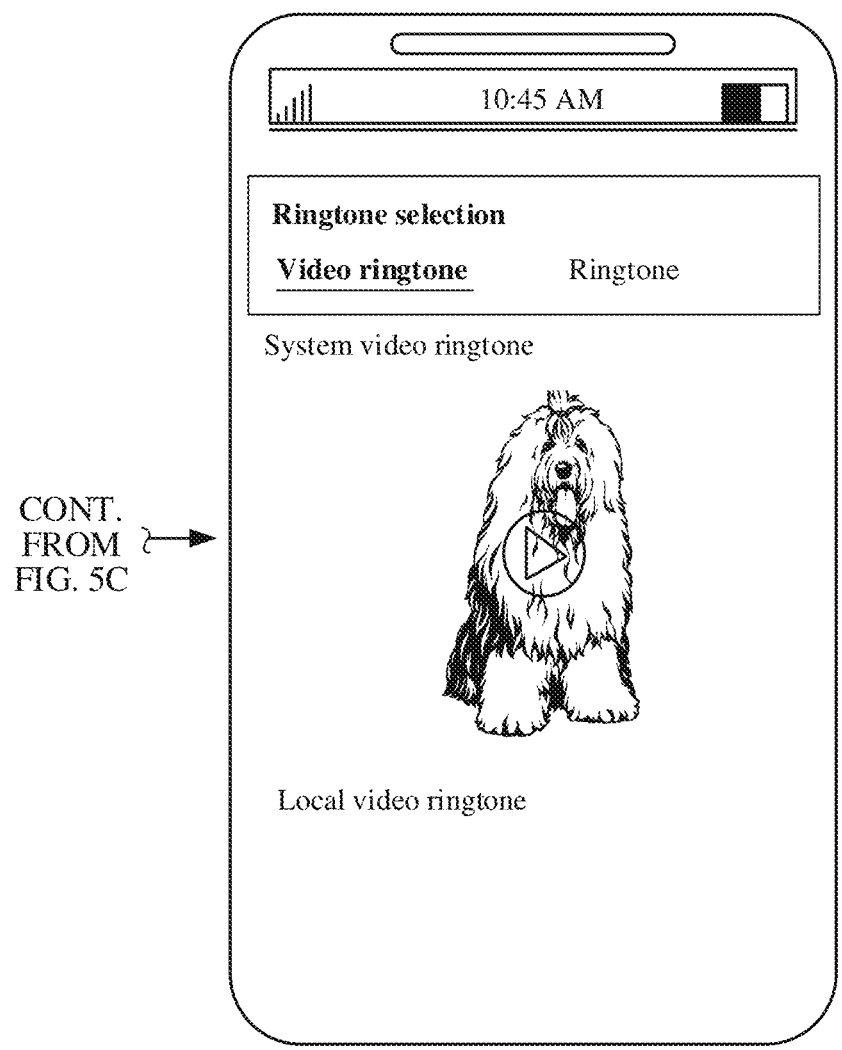
Figure 6:
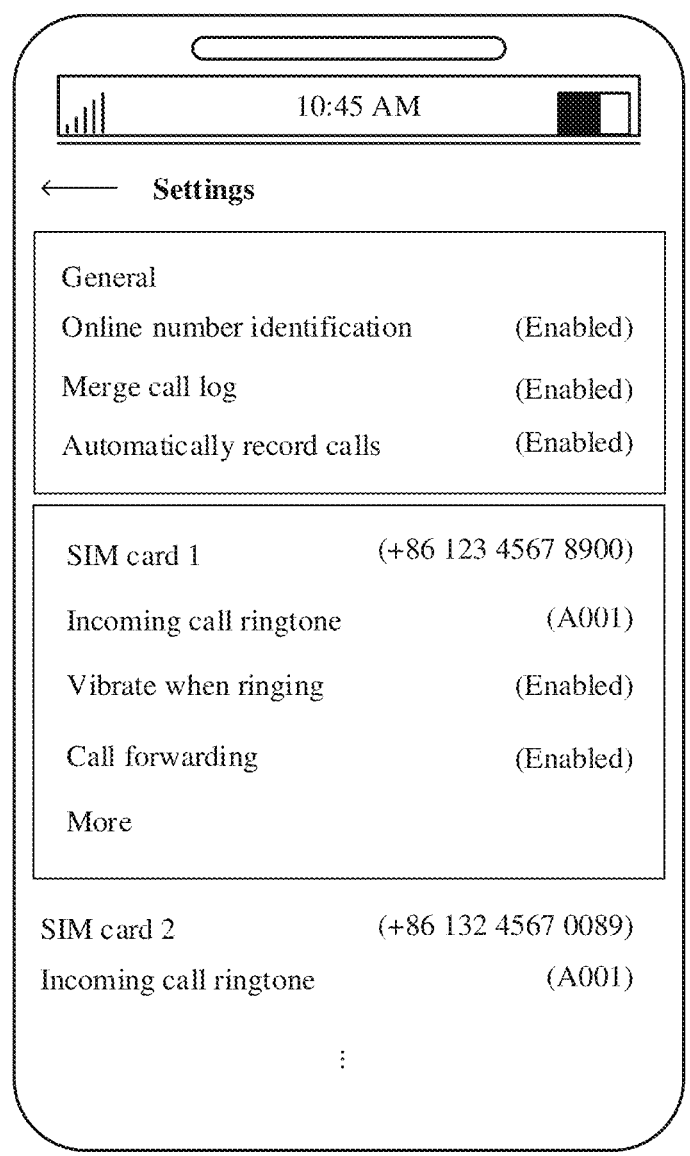
FIG. 6 is a schematic diagram of an interface in a second implementation of a smartphone according to an embodiment of this application.

The smartphone shown in FIG. 5A is a mobile phone installed with one SIM card. In another optional implementation of this embodiment of this application, the smartphone may be installed with at least two SIM cards. FIG. 6 shows a setting item interface of a smartphone installed with two SIM cards. For a smartphone installed with at least two SIM cards, the corresponding SIM cards include same setting items. Based on this, the user may use an incoming call ringtone option control of each SIM card to set an incoming all ringtone for the SIM card. A process in which the user sets an incoming all ringtone corresponding to any SIM card is the same as the process corresponding to FIG. 5A to FIG. 5D.

In the embodiment shown in FIG. 6, the user may perform settings to enable two SIM cards correspond to a same audio/video file. The user may alternatively perform settings to enable a first SIM card to correspond to a first audio/video file, and enable a second SIM card to correspond to a second audio/video file.

Figure 7A:
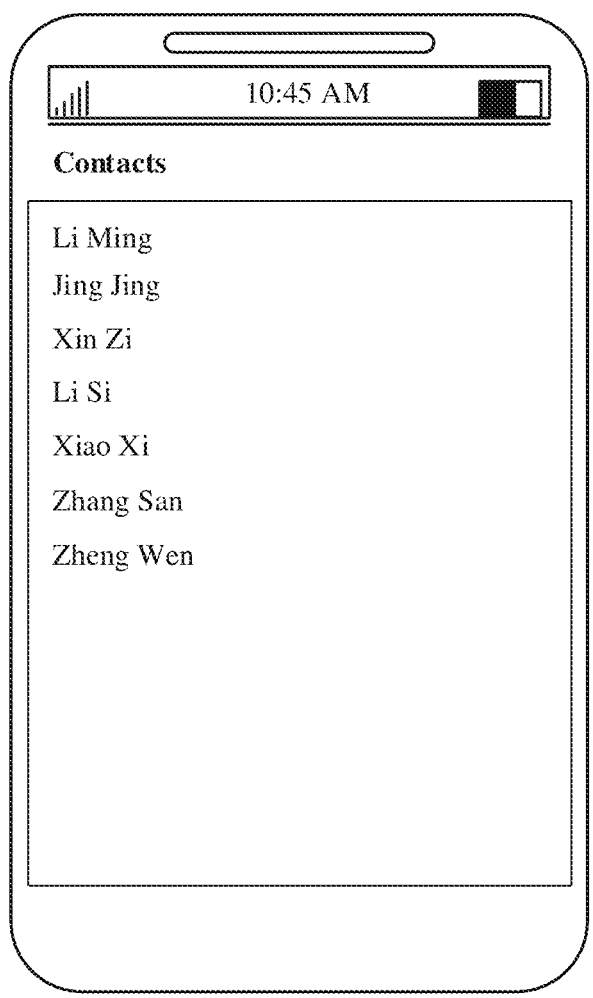
FIG. 7A to FIG. 7C are a schematic diagram of an interface in a third implementation of a smartphone according to an embodiment of this application.
Figure 7B:
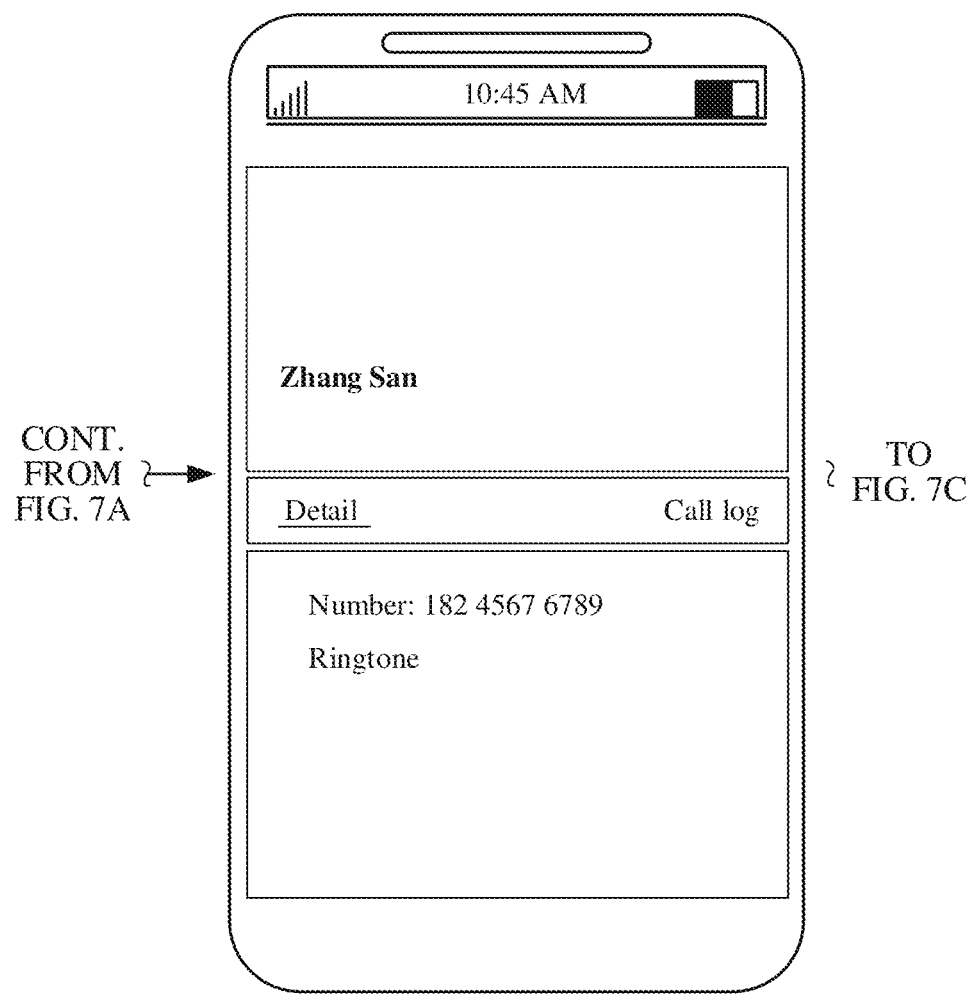
Figure 7C:
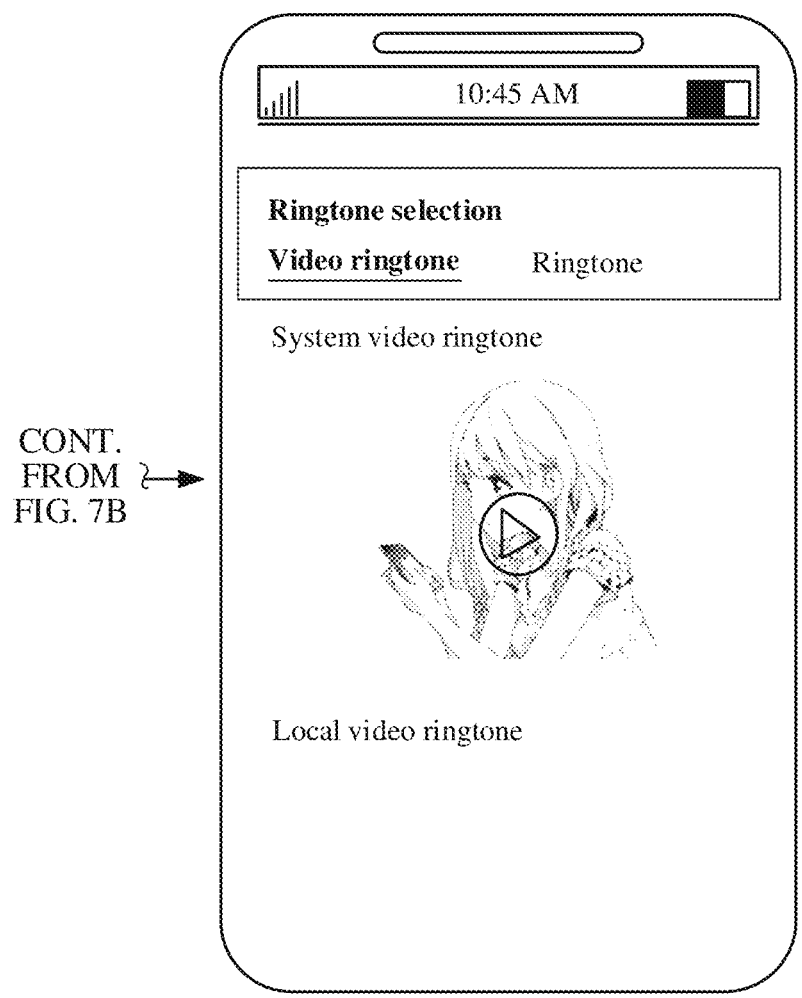

An implementation process of establishing a correspondence between a specified contact and an audio/video file by the user is as follows: As shown in FIG. 7A to FIG. 7C, the user triggers the terminal to display a contact list. An interface for displaying the contact list is shown in FIG. 7A. In this embodiment, for example, the user sets an incoming call video ringtone of a contact "Zhang San", and triggers the contact "Zhang San", so that the terminal displays an information editing interface of the contact "Zhang San" shown in FIG. 7B. Various information setting controls of the contact "Zhang San", for example, an incoming call ringtone option control, are disposed on the information editing interface. Next, the user triggers the incoming call ringtone option control, so that the terminal displays the interface shown in FIG. 5B. Then, similar to the user operation process corresponding to FIG. 5A to FIG. 5D, the user triggers the video ringtone control shown in FIG. C7, so that the terminal displays an interface such as that shown in FIG. 5C. Further, the user selects one audio/video file from the audio/video file name list, where the audio/video file includes incoming call alert audio/video when a call is received from the contact "Zhang San".

Figure 8A:
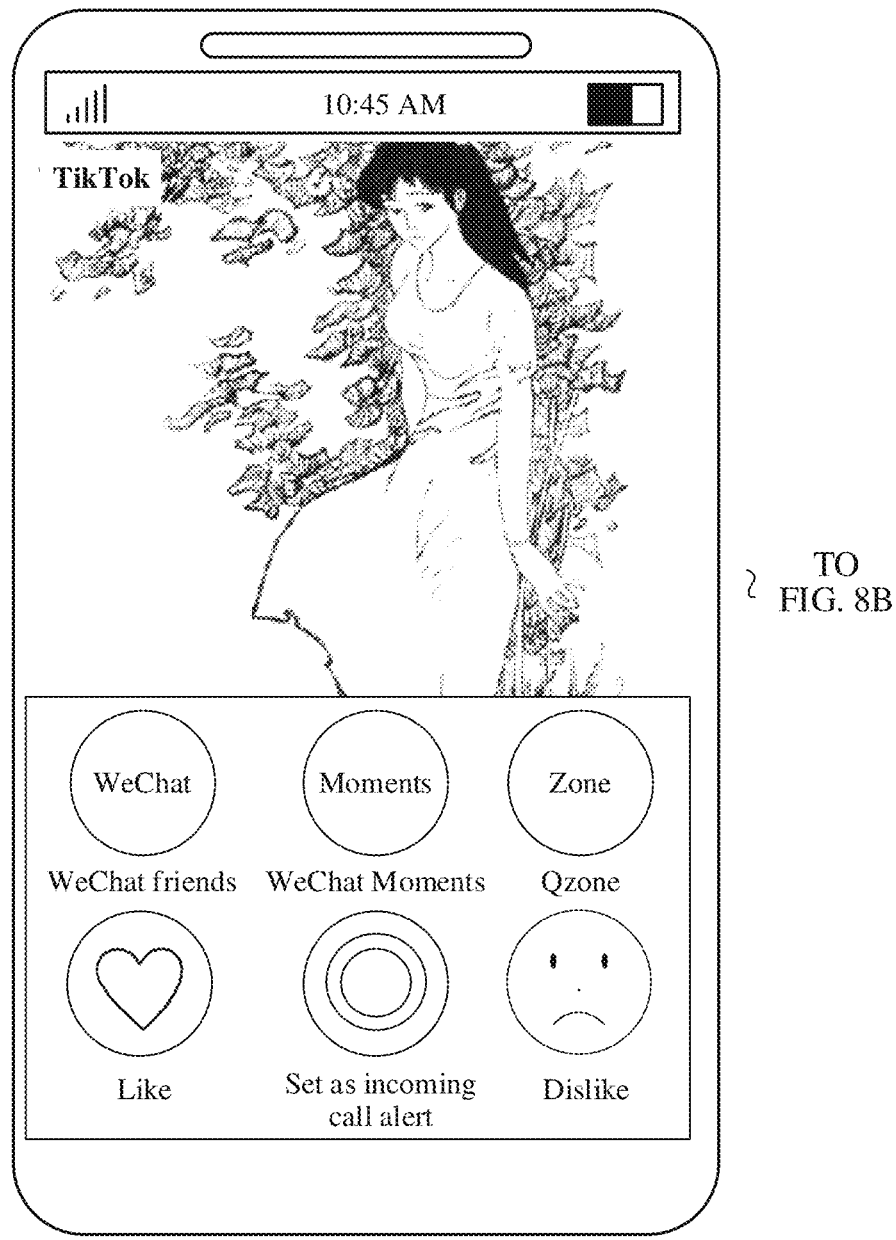
FIG. 8A and FIG. 8B are a schematic diagram of an interface in a fourth implementation of a smartphone according to an embodiment of this application.
Figure 8B:
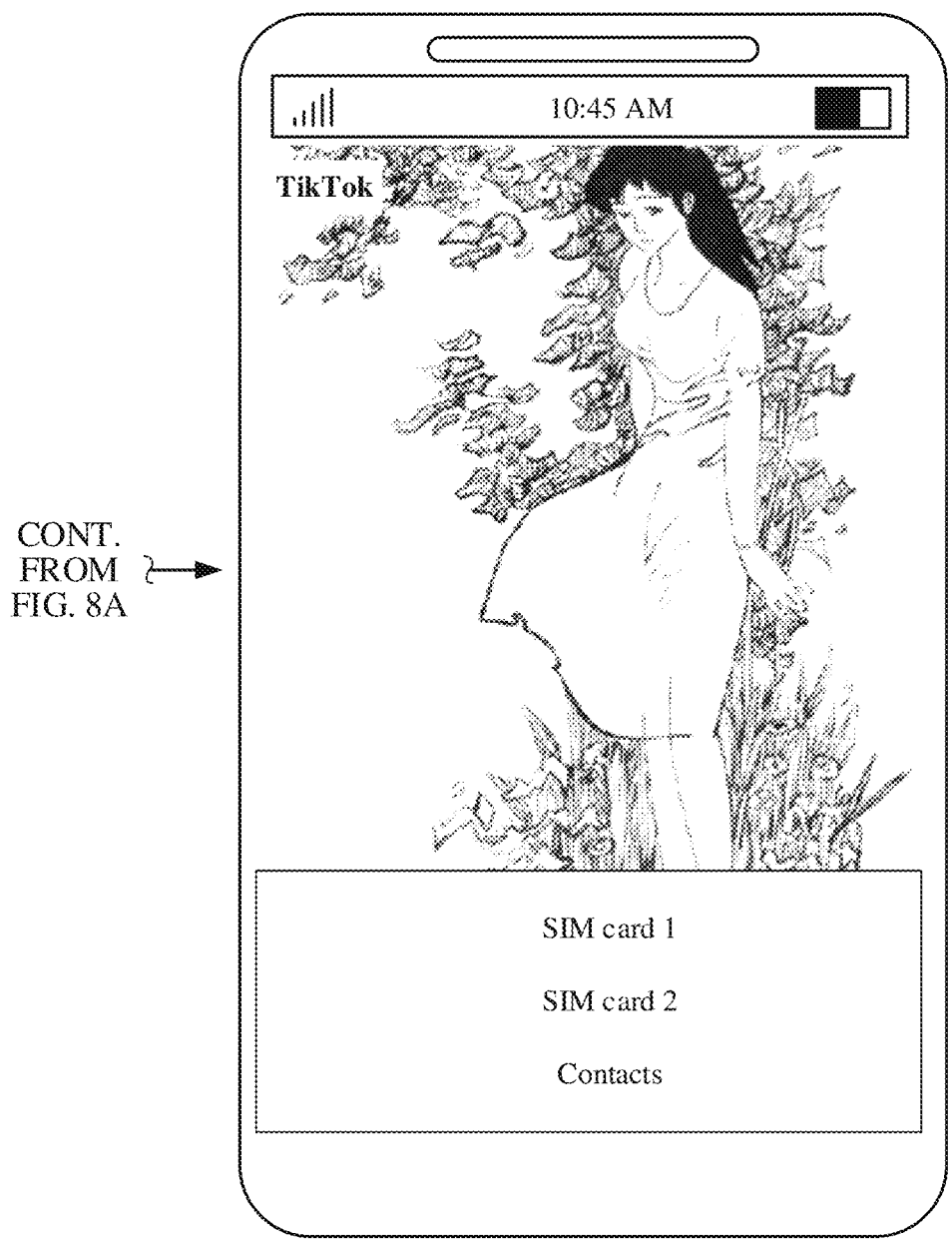

In addition, as shown in FIG. 8A, an extended control of a third-party APP installed in the terminal may include an "incoming call alert setting" control. Based on this, the user triggers the "incoming call alert setting" control to send a setting instruction to a processor of the terminal, so that the terminal displays an interface shown in FIG. 8B. The interface shown in FIG. 8B may include a menu. Two controls, that is, a SIM card control and a contact control, are disposed in the menu. The user triggers the SIM card control, to set audio/video currently played by using the third-party APP, as incoming call alert audio/video corresponding to a SIM card. The user triggers the contact control, so that the terminal displays the interface shown in FIG. 7A. Then, the user may specify a target contact in the contact list shown in FIG. 7A, to set the audio/video currently played by using the third-party APP, as incoming call alert audio/video corresponding to the target contact. In another embodiment, the menu displayed on the display interface of the terminal includes three controls: a "SIM card 1" control, a "SIM card 2" control, and a contact control.

Figure 9A:
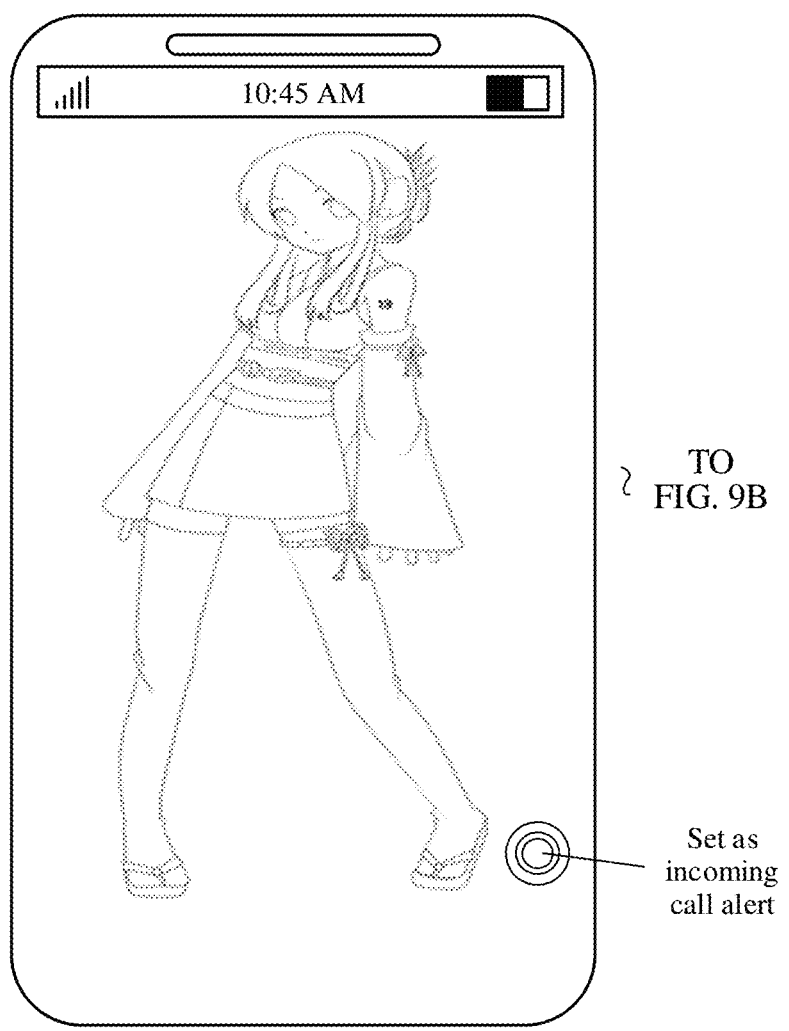
FIG. 9A and FIG. 9B are a schematic diagram of an interface in a fifth implementation of a smartphone according to an embodiment of this application.
Figure 9B:
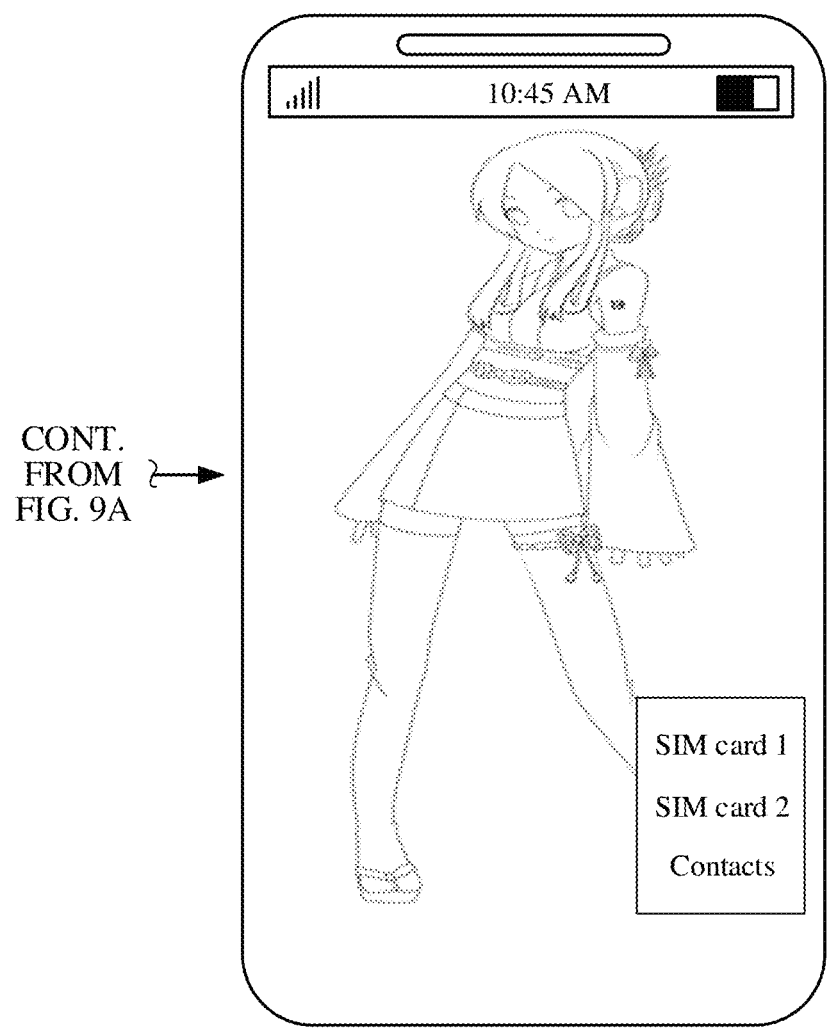

In some other implementations of this embodiment of this application, in a process in which the user plays any audio/video prestored in the terminal, as shown in FIG. 9A, a display interface also includes an "incoming call alert setting" control. The user triggers the "incoming call alert setting" control, and then an interface shown in FIG. 9B is displayed on the interface of the terminal. Further, the user may set a currently played audio/video as incoming call alert audio/video for a SIM card 1, and/or a SIM card 2, and/or a contact depending on a requirement. In this embodiment, a user setting process and a terminal response process are the same as those in the embodiment shown in FIG. 8A and FIG. 8B.

Moreover, in actual application, the user may set incoming call alert audio/video for some contact groups, and set an incoming call alert audio for some other contact groups. Likewise, the user may set incoming call alert audio/video for some contacts, and set an incoming call alert audio for some other contacts. Operation processes in which the user sets an incoming call alert audio for a contact group and a contact are similar to those shown in FIG. 5A to FIG. 5D to FIG. 9A and FIG. 9B. The operations in which the user sets an incoming call alert audio for a contact group and a contact are different from the foregoing embodiment in that, the user triggers a ringtone control in the ringtone selection control included in the interface shown in FIG. 5B. Further, the terminal displays an audio file name list.

With reference to the embodiments shown in FIG. 5A to FIG. 5D to FIG. 9A and FIG. 9B, in some other embodiments, after setting audio/video corresponding to a contact group and/or a contact, the user may further preview a playing effect of the audio/video that is newly set. For example, if the user triggers the image of the audio/video in FIG. 5D, the terminal may be triggered to play the audio/video. In this scenario, the audio/video is previewed. A specific operation of playing the audio/video by the terminal is detailed below.

It can be understood that the operation, corresponding to FIG. 5A to FIG. 5D to FIG. 9A and FIG. 9B, of establishing the correspondence between a contact and an audio/video file is described merely by using the smartphone as an example, and does not constitute any limitation on establishment of the correspondence between a contact and an audio/video file in this solution. In some other embodiments, for example, if this solution is implemented in a QQ™ program, the SIM card in the foregoing embodiment may be replaced with a buddy group prestored in the QQ program.

The foregoing describes the implementation scenario and preparations for incoming call alert in the embodiments of this application from a perspective of a user. The following describes the terminal and the incoming call alert method for the terminal that are provided in the embodiments of this application.

Figure 10:
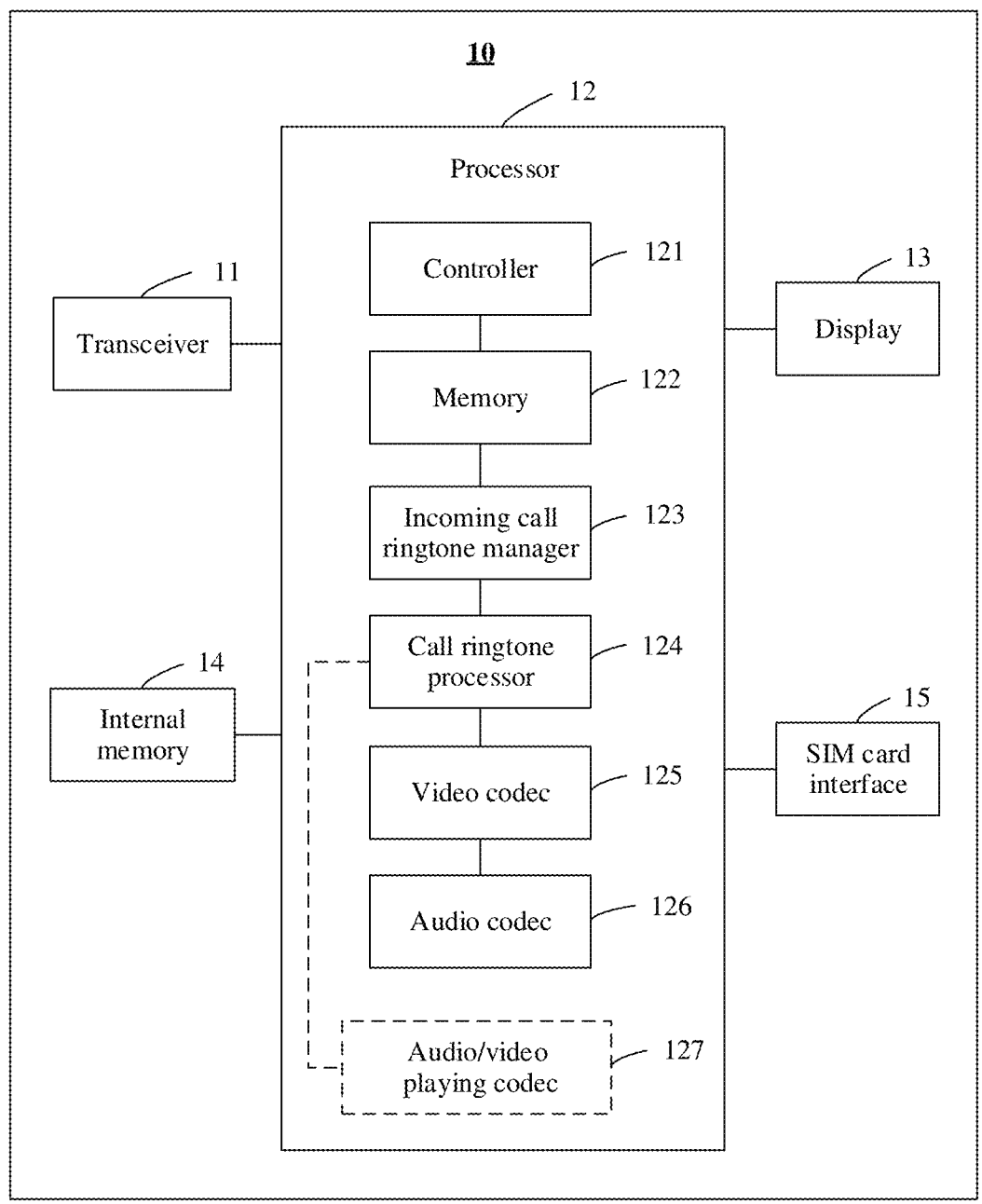
FIG. 10 is a schematic diagram of a hardware structure in an implementation of a terminal according to an embodiment of this application.

As shown in FIG. 10, a terminal 10 includes a transceiver 11, a processor 12, a display 13, and an internal memory 14 that are connected to each other through a bus interface.

It should be understood that the structure illustrated in FIG. 10 does not constitute any specific limitation on the terminal 10. In some other embodiments, the terminal 10 may include more or fewer components than those shown in the figure, a combination of some components, splitting of some components, or a different arrangement of the components. The illustrated components may be implemented by hardware, software, or a combination of software and hardware.

The transceiver 11 may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof.

The processor 12 may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The processor 12 may include one or more processing units. For example, the processor 12 may include a controller 121, a memory 122, an incoming call ringtone manager 123, a call ringtone processor 124, a video codec 125, and an audio codec 126 (or an audio/video playing codec 127).

In some embodiments, the video codec 125 and the audio codec 126 are two independent integration components. An integration component in the two integration components that is used for video encoding and decoding implements video encoding and decoding functions, and an integration component in the two integration components that is used for audio encoding and decoding implements audio encoding and decoding functions. In some other embodiments, the video codec 125 and the audio codec 126 are one integration component, and the integration component implements audio/video encoding and decoding. The integration component is referred to as an audio/video codec 125. Different processing units may be independent components, or may be integrated into one or more processors.

The controller 121 may be a nerve center and a command center of the terminal 10. The controller 121 may generate an operation control signal based on instruction operation code and a sequence signal, to control instruction fetching and instruction execution.

The processor 12 may further be provided with the memory 122, configured to store an instruction and data. In some embodiments, the memory 122 in the processor 12 is a cache 122. The memory 122 may store an instruction or data recently used or cyclically used by the processor 12. If the processor 12 needs to use the instruction or data again, the processor 12 may directly invoke the instruction or data from the memory 122. This avoids repeated access and reduces a waiting time of the processor 12, thereby improving system efficiency.

The incoming call ringtone manager 123 is configured to maintain a correspondence between an audio/video file and a contact group, a correspondence between an audio/video file and a contact, a correspondence between an audio file and a contact group, and a correspondence between an audio file and a contact.

The call ringtone processor 124 is configured to: determine a to-be-played audio/video based on incoming call request information, and obtain a corresponding audio/video file from a stored audio/video file. The call ringtone processor 124 is further configured to: determine a to-be-played audio based on the incoming call request information, and obtain a corresponding audio file from a stored audio file.

The video codec 125 is configured to compress or decompress a digital video. The terminal 10 can support one or more types of video codecs 125. In this way, the terminal 10 may play or download videos in a plurality of encoding formats, for example, a moving image experts group (MPEG).

The audio codec 126 is configured to perform digital-analog conversion on a sound file, and compress or decompress digital audio. The terminal 10 can support one or more types of audio encoders. In this way, the terminal 10 may play or download audios in a plurality of encoding formats, for example, a windows media audio (WMA).

The display 13 is configured to display an image, a video, and the like. The display 13 includes a display panel 131. The display panel 131 may use a liquid crystal display (LCD), an organic light-emitting diode (OLED), an active-matrix organic light-emitting diode (AMOLED), a flexible light-emitting diode (FLED), a mini LED, a micro LED, a micro OLED, a quantum dot light-emitting diode (QLED), or the like.

The internal memory 14 may be configured to store computer executable program code, where the executable program code includes an instruction. The processor 12 executes various function applications and performs incoming call alert processing of the terminal 10 by running the instruction stored in the internal memory 14. The internal memory 14 may include a program storage area and a data storage area. The program storage area may store an operating system, an application program required by at least one function (for example, an audio playback function or a video playback function), and the like. The data storage area may store information (for example, at least one audio/video file) required during use of the terminal 10, and the like. In addition, the internal memory 14 may include a volatile memory 122, for example, a random-access memory (RAM) 122. Alternatively, the internal memory 14 may include a non-volatile memory 122, for example, a read-only memory (ROM) 122, a flash memory 122, a hard disk drive (HDD), or a solid-state drive (SSD). Alternatively, the internal memory 14 may include a combination of the foregoing types of memories 122. The bus interface may include any quantity of interconnected buses and bridges, and specifically connects together circuits that are of one or more processors represented by the processor 12 and of a memory 122 represented by the internal memory 14. The bus interface may further connects together other circuits such as a peripheral device, a voltage regulator, and a power management circuit.

In some embodiments, the bus interface may include a mobile industry processor interface (MIPI) and a general purpose input/output (GPIO) interface.

The MIPI interface may be configured to connect the processor 12 to peripheral components such as the display 13 and a camera. The MIPI interface includes a camera serial interface (CSI), a display serial interface (DSI), and the like. In some embodiments, the processor 12 communicates with the camera (not shown in FIG. 10) through the CSI interface, to implement a photographing function of the terminal 10. The processor 12 communicates with the display 13 through the DSI interface, to implement a display function of the terminal 10.

The GPIO interface may be configured by using software. The GPIO interface may be configured as a control signal path, or may be configured as a data signal path. In some embodiments, the GPIO interface may be configured to connect the processor 12 to the camera, the display 13, a wireless communications module, an audio/video module, a sensor module, and the like. The wireless communications module, the audio/video module, and the sensor module are not shown in FIG. 10.

It can be understood that interface connection relationships between the modules that are described in this embodiment are merely examples for description, and do not constitute any limitation on a structure of the terminal 10. In some other embodiments, alternatively, the terminal 10 may use interface connection manners different from those in this embodiment or use a combination of a plurality of interface connection manners.

In some embodiments, the terminal 10 is provided with a SIM card interface 15. The SIM card interface 15 is configured to connect to a SIM card. The SIM card may be inserted into the SIM card interface 15, to come into contact with the terminal 10. The terminal 10 can support one or N SIM card interfaces, where N is a positive integer greater than 1. The SIM card interface 15 can support a nano-SIM card, a micro-SIM card, a SIM card, and the like. A plurality of cards may be inserted into a same SIM card interface at the same time. The plurality of cards may be of a same type or different types. The SIM card interface may also be compatible with different types of SIM cards. The terminal 10 interacts with a network by using a SIM card, to implement a call function, a data communication function, and the like. In some embodiments, the terminal 10 uses an eSIM, that is, an embedded SIM card. The eSIM card may be embedded in the terminal 10 and cannot be separated from the terminal 10.

In some other embodiments, a system built in the terminal 10 is installed with a third-party instant messaging application program. The third-party instant messaging application program is, for example, WeChat™ or QQ™. The terminal 10 implements a call function, a video function, and the like by using the third-party instant messaging application program.

It can be learnt that, by using this implementation, the processor 12 of the terminal 10 is provided with the video codec 125 and the audio codec 126 (or the audio/video playing codec 127). In this way, when the terminal 10 receives an incoming call request, the processor 12 can invoke the video codec 125 and the audio codec 126 (or the audio/video playing codec 127) of the terminal 10 to play audio/video used for incoming call alert. Therefore, a third-party video player does not need to be installed in the terminal 10, and the terminal 10 does not need to invoke a third-party APP when playing the video and the audio used for incoming call alert. This can reduce occupied system resources.

A software system of the terminal 10 may use a layered architecture, an event driven architecture, a microkernel architecture, a microservices-based architecture, or a cloud architecture. In this embodiment, an Android system with a layered architecture is used as an example for describing a software structure of the terminal 10.

Figure 11:
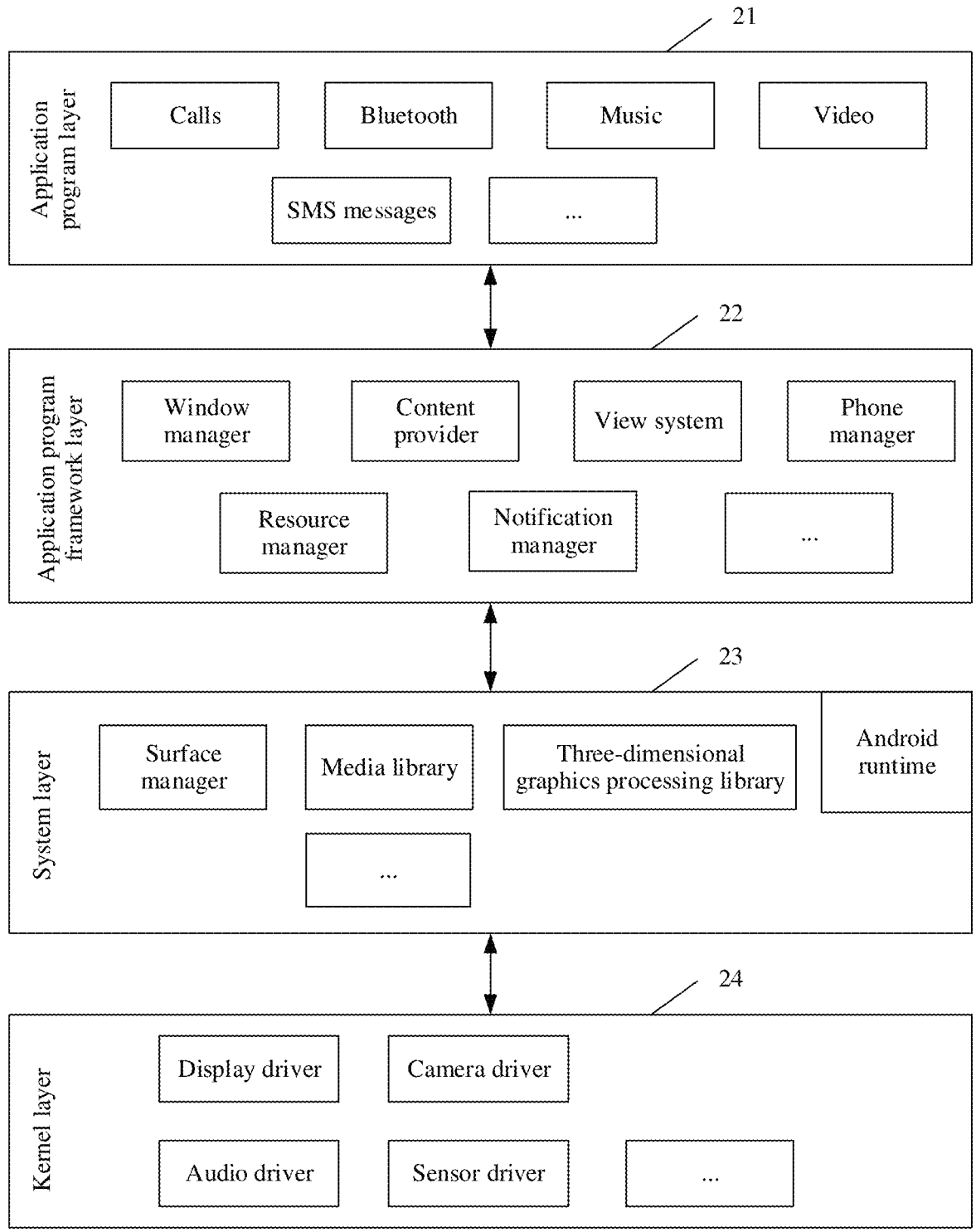
FIG. 11 is a schematic diagram of a software structure in an implementation of a terminal shown in FIG. 10 according to an embodiment of this application.

FIG. 11 is a block diagram of a software structure of a terminal 10 according to an embodiment.

In the layered architecture, software is divided into several layers, and each layer has clear roles and tasks. The layers communicate with each other through a software interface. In some embodiments, the Android system is divided into four layers from top to bottom: an application program layer 21, an application program framework layer 22, a system layer 23, and a kernel layer 24.

The application program layer 21 may include a series of application program packages.

As shown in FIG. 11, the application program package may include application programs such as calls, WLAN, music, video, and SMS messages.

The application program framework layer 22 provides an application programming interface (API) and a programming framework for an application program at the application program layer 21. The application program framework layer 22 includes some predefined functions, for example, an audio/video ringtone setting interface.

As shown in FIG. 11, the application program framework layer 22 may include a window manager, a content provider, a view system, a phone manager, a resource manager, an alert manager, an audio/video player, and the like.

The window manager is configured to manage a window program. The window manager may obtain a size of a display screen, determine whether there is a status bar, a menu, or an operation instruction control, and the like.

The content provider is configured to: store and obtain data, and enable the data to be accessible by an application program. The data may include audio, a video, calls that are made and answered, a browsing bookmark, a phone book, and the like.

The view system includes visual controls, for example, a control for displaying a caller ID display interface and a TextureView control. The view system may be configured to construct an application program.

The phone manager is configured to provide a communication function for the terminal 10, for example, management of a call status (including connected, hung up, and the like).

The resource manager provides application programs with various resources such as a localized character string, an icon, and an audio/video file used for incoming call alert.

The system layer 23 includes an Android runtime and a system library.

The Android runtime includes a core library and a virtual machine. The Android runtime is responsible for scheduling and management of the Android system.

The core library includes two parts: One part is a performance function that needs to be called by a java language, and the other part is an Android core library.

The application program layer 21 and the application program framework layer 22 run in the virtual machine. The virtual machine executes java files of the application program layer 21 and the application program framework layer 22 as binary files. The virtual machine is configured to implement functions such as object lifecycle management, stack management, thread management, security and exception management, and garbage collection.

The system library may include a plurality of function modules, such as a surface manager, a media library, and a three-dimensional graphics processing library (for example, OpenGL ES).

The surface manager is configured to manage a display subsystem, and fuse 2D and 3D layers for a plurality of application programs.

The media library supports audios/videos in a plurality of commonly used formats, and supports static image files and the like. The media library can support a plurality of audio/video encoding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The kernel layer 24 is a layer between hardware and software. The kernel layer 24 includes at least a display driver, a camera driver, an audio driver, and a sensor driver.

It can be understood that the software structure shown in FIG. 11 is merely a software architecture by using the Android system as an example, and does not constitute any specific limitation on the terminal 10. In some other embodiments, the terminal 10 may use an iOS system, a windows system, or the like. In addition, a layout of the software architecture of the terminal 10 may be different from that shown in FIG. 11, modules in the software architecture that perform various functions are more or fewer than those shown in FIG. 11, an arrangement of modules that perform different functions is different from that shown in FIG. 11, and the like.

Figure 12:
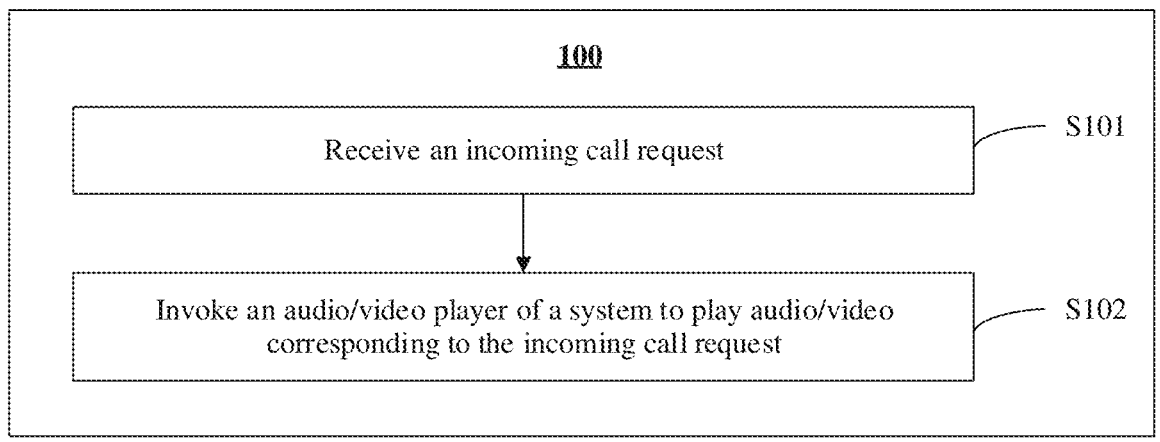
FIG. 12 is a method flowchart of an implementation of an incoming call alert method according to an embodiment of this application.

For example, all technical solutions in the following embodiments may be implemented in the terminal 10 that is of the foregoing hardware architecture and software architecture. With reference to the accompanying drawings and an application scenario, the following details the incoming call alert method provided in the embodiments of this application. FIG. 12 is a method flowchart of an implementation of an incoming call alert method according to an embodiment of this application. The incoming call alert method 100 shown in FIG. 12 includes the following steps:

Step S101: Receive an incoming call request.

Step S102: Invoke an audio/video player of a system to play audio/video corresponding to the incoming call request.

Before step S101, based on the embodiments shown in FIG. 2 to FIG. 4, the terminal 10 stores one or more audio/video files. With reference to the schematic structural diagrams of the terminal 10 that are shown in FIG. 10 and FIG. 11, after the transceiver 11 receives a storage instruction entered by a user, the processor 12 stores, in the internal memory 14, a target audio/video file indicated by the storage instruction.

For example, with reference to the embodiments shown in FIG. 3 and FIG. 4, the transceiver 11 receives an extension instruction entered by the user, and the transceiver 11 sends, to the processor 12, request information indicated by the extension instruction. In response to the request information, the processor 12 triggers the application program framework layer 22 to obtain, from the content provider, content of a control menu corresponding to the extension instruction, and then the window manager in the application program framework layer 22 displays, on an interface of the terminal 10, the control menu corresponding to the extension instruction. Further, the transceiver 11 receives a download instruction. The download instruction includes an address of the audio/video S in a third-party APP server. The address of the audio/video S in the third-party APP server is, for example, a uniform resource locator (URL) of the audio/video S or a uniform resource identifier (URI) of the audio/video S. The processor 12 calls a function of the system layer 23 to access the address of the audio/video S in the third-party APP server, and obtains a file of the audio/video S from the third-party APP server. Then, the processor 12 stores the file of the audio/video S in the internal memory 14. Alternatively, the processor 12 may store the file of the audio/video S in a cache memory 122 of the terminal in which the third-party APP (that is, a directory of the third-party APP) is located. The resource manager maintains an identifier of the stored audio/video file and a correspondence between each audio/video file and an identifier of the audio/video file.

It can be understood that, in some embodiments, the internal memory 14 stores a compressed file including audio data and video data. The media library in the system layer 23 defines formats supported by the compressed file, such as MPEG-4, H.264, MP3, AAC, AMR, JPG, and PNG. In some other embodiments, the internal memory 14 stores a compressed file including audio data and a compressed file including video data. The processor 12 may set a same file identifier for a compressed audio file and a compressed video file that are in a correspondence with each other. The file identifier may be a numeral, a letter, or a character string including a numeral and a letter. The file identifier is, for example, "A001". The media library in the system layer 23 defines formats supported by the compressed audio file, such as MP3 and WMA; and defines a plurality of formats supported by the compressed video file, such as MPEG and MP4.

For example, the following describes the technical solution in this embodiment of this application by using an example in which an audio/video file is a compressed file including audio data and video data.

Further, based on the embodiments shown in FIG. 5A to FIG. 5D to FIG. 9A and FIG. 9B, the terminal 10 may further establish a correspondence between contact information and an audio/video file in response to a user operation. With reference to the schematic structural diagram of the terminal 10 shown in FIG. 10, the terminal 10 may establish the correspondence between contact information and an audio/video file in the following implementations.

A first implementation: The transceiver 11 receives a first setting instruction entered by the user, where the first setting instruction includes first contact information. In response to the first setting instruction, the processor 12 triggers the application program framework layer 22 to obtain an audio/video file name from the content provider, and arranges the audio/video file name into a list. Then, the window manager in the application program framework layer 22 triggers the display 13 to display the audio/video file name list. The transceiver 11 receives a first selection instruction entered by the user, and transmits the first selection instruction to the processor 12. The first selection instruction includes a first audio/video file identifier. Further, the processor 12 triggers the resource manager to obtain the first audio/video identifier, and enables the resource manager to maintain a correspondence between the first audio/video file identifier and the first contact information.

This embodiment is an implementation of selecting, based on contact information, an audio/video file corresponding to the corresponding contact information. In this embodiment, various operation instructions received by the terminal 10 may be corresponding to user operations in the embodiment shown in any one of FIG. 5A to FIG. 5D to FIG. 7A to FIG. 7C.

A second implementation: The transceiver 11 receives a second setting instruction entered by the user, where the second setting instruction includes a second audio/video file identifier. In response to the second setting instruction, the processor 12 triggers the application program framework layer 22 to obtain contact information from the content provider, and arranges the contact information into a list. Then, the window manager in the application program framework layer 22 triggers the display 13 to display the contact information list. The transceiver 11 receives a second selection instruction entered by the user, and transmits the second selection instruction to the processor 12. The second selection instruction includes second contact information. Further, the processor 12 triggers the resource manager to obtain the second contact information, and enables the resource manager to maintain a correspondence between the second audio/video file identifier and the second contact information.

This embodiment is an implementation of selecting, based on an audio/video file, contact information corresponding to the audio/video file. In this embodiment, various operation instructions received by the terminal 10 may be corresponding to user operations in the embodiment shown in FIG. 9A and FIG. 9B.

A third implementation: The transceiver 11 receives a third setting instruction entered by the user, where the third setting instruction includes an address of a third audio/video file in a third-party audio/video APP server. The transceiver 11 sends the third setting instruction to the processor 12. In response to the third setting instruction, the processor 12 calls the function of the system layer 23 to access the address, and obtains the third audio/video file. Further, the processor 12 triggers the resource manager to determine an identifier for the third audio/video file. In addition, in response to the third setting instruction, the processor 12 further triggers the application program framework layer 22 to obtain contact information from the content provider, and arranges the contact information into a list. Then, the window manager in the application program framework layer 22 triggers the display 13 to display the contact information list. The transceiver 11 receives a third selection instruction entered by the user, and transmits the third selection instruction to the processor 12. The third selection instruction includes third contact information. Further, the processor 12 triggers the resource manager to obtain the third contact information, and enables the resource manager to maintain a correspondence between a path of the third audio/video file and the third contact information.

This embodiment is an implementation of directly determining audio/video played by using a third-party APP, as audio/video corresponding to contact information. In this embodiment, various operation instructions received by the terminal 10 may be corresponding to user operations in the embodiment shown in FIG. 8A and FIG. 8B.

It should be noted that, in some embodiments, that the incoming call ringtone manager 123 obtains the audio/video file identifier based on the path may be: The processor 12 calls the audio/video ringtone setting interface, to obtain data of the third audio/video file, and to set third audio/video as audio/video used for incoming call alert. For example, the processor 12 triggers a "RingtoneManager. etActualDefaultRingtoneUri (Context context, int type, Uri ringtoneUri)" interface that is provided by the application program framework layer 22 for the application program layer 21, to perform a corresponding operation.

It can be understood that, with reference to the software architecture of the terminal 10 shown in FIG. 11, various operation instructions received by the transceiver 11 are defined by the core library by using a java language, and are managed and invoked by using the window manager and the content provider in the application program framework layer 22. In addition, the processor invokes the sensor driver in the kernel layer 24 to trigger the foregoing process. Moreover, to-be-displayed content controlled by the surface manager in the foregoing embodiments is triggered by the display driver in the kernel layer 24 for display.

The incoming call request may be represented in a form of a data frame. The data frame conforms to a communication protocol supported by the terminal 10. The incoming call request may include a contact identifier of a calling contact. The contact identifier may be included in a reserved bit of the data frame in communication information. The processor 12 invokes the phone manager in the application program framework layer 22 to receive the incoming call request.

Further, after step S101 is performed and before step S102 is performed, the method 100 further includes: reading the contact identifier in the incoming call request, and determining an audio/video identifier corresponding to the contact identifier.

In some embodiments, the processor 12 may invoke the application program layer 21 to read the contact identifier in the incoming call request. Further, the processor 12 invokes the application program framework layer 22 to determine the audio/video file identifier of the to-be-displayed audio/video based on the contact identifier.

It can be learnt from the foregoing description of establishment of the correspondence between contact information and an audio/video file that, in some embodiments, the audio/video file identifier and the contact identifier are stored in a correspondence manner. In some other embodiments, the audio/video file identifier and a contact group identifier are stored in a correspondence manner. Based on this, in this embodiment, the application program framework layer 22 may traverse a storage relationship in the resource manager for a contact identifier. If the contact identifier is found in the storage relationship, the application program framework layer 22 reads the audio/video file identifier corresponding to the contact identifier, and obtains, from the content provider, audio/video data indicated by the audio/video file identifier. If the contact identifier is not found in the storage relationship, the application program framework layer 22 obtains, from the resource manager, the contact group identifier corresponding to the contact identifier. Further, the application program framework layer 22 reads, in the storage relationship, the audio/video file identifier corresponding to the contact group identifier, and obtains, from the content provider, audio/video data indicated by the audio/video file identifier.

Further, after the audio/video data is obtained, the call ringtone processor 124 may invoke the audio/video playing codec 127 to decode the audio/video file and play the decoded audio/video file. Then, the application program framework layer 22 invokes the audio/video player to play the corresponding audio/video. The audio/video player in the application program framework layer 22 is, for example, MediaPlayer.

In addition, the contact identifier may also corresponding to an audio file. In response to the audio file corresponding to the contact identifier, the call ringtone processor 124 may invoke the audio codec 126 to decode the audio file and play the decoded audio file.

It can be understood that playing of the audio also requires an action of the audio driver in the kernel layer 24. Likewise, playing of the audio/video also requires actions of the audio driver and the display driver in the kernel layer 24.

It can be learnt that, by using the incoming call alert method in this embodiment of this application, the terminal 10 may invoke the audio/video player that comes with the system, to play the audio/video corresponding to the incoming call request. In this way, the terminal 10 does not need to invoke a third-party video player to play the incoming call alert video. This reduces occupied system resources, and can ensure a correspondence between the audio and the video, thereby improving use experience of the user.

Further, the processor 12 invokes the display 13 to display a caller ID display interface and the video, while the application program framework layer 22 plays the audio/video. Based on this, in some embodiments, after the terminal 10 receives the incoming call request, the processor 12 may invoke the view system to integrate the caller ID display interface with the video.

Figure 13:
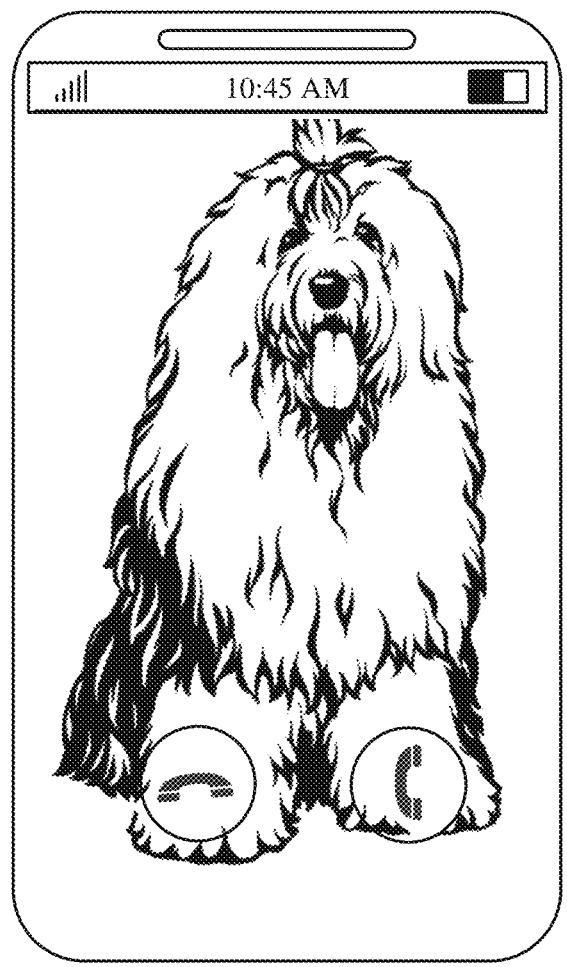
FIG. 13 is a schematic diagram of an interface in a display manner of a terminal according to an embodiment of this application.

For example, the view system may invoke the TextureView control to embed an image of the video into a bottom layer of the caller ID display interface, so that the caller ID display interface and the video are integrated in terms of a visual effect. For example, a display effect of the display is shown in FIG. 13. It can be learnt that, in the incoming call alert method in this embodiment of this application, the video and the caller ID display interface that are displayed by the terminal are integrated in terms of a visual effect, thereby improving use experience of the user.

It can be understood that, the manner in which the caller ID display interface and the video are processed by using the TextureView control and that is described in this embodiment is merely an example for description, and does not constitute any limitation on integration of the caller ID display interface with the video in this embodiment of this application. In some other embodiments, the terminal 10 may alternatively integrate the caller ID display interface with the video in a manner different from the foregoing implementation.

In addition, after playing the audio/video, the terminal 10 may receive an answering or hang-up operation instruction entered by the user. After the terminal 10 receives the answering or hang-up operation instruction, the phone manager provides a corresponding communication function for the terminal 10. In this case, the call ringtone processor 124 stops playing the audio/video.

In summary, in the incoming call alert method in this embodiment of this application, hardware of the terminal includes an audio processing module and a video processing module, so that when the terminal receives the incoming call request, the terminal can play the video used for incoming call alert and the audio corresponding to the video. In this way, a third-party video player does not need to be installed and invoked in the terminal. This can reduce occupied system resources. In addition, in this embodiment of this application, the terminal combines an operation control of the caller ID display interface with a video image, so that the video and the caller ID display interface that are displayed by the terminal are integrated in terms of a visual effect, thereby improving use experience of the user.

In the foregoing embodiments, solutions of the incoming call alert method provided in this embodiment of this application are described from perspectives of the hardware structure and the software structure of the terminal and actions performed by the software and the hardware. Persons skilled in the art should easily be aware that, in combination with the processing steps of the audio/video files described in the embodiments disclosed in this specification, the embodiments of this application may not only be implemented by hardware or a combination of hardware and computer software. Whether a function is performed by hardware or hardware driven by computer software depends on particular applications and design constraints of the technical solutions. Persons skilled in the art may use different methods to implement the described functions for each particular application, but it should not be considered that the implementation goes beyond the scope of this application.

Figure 14:
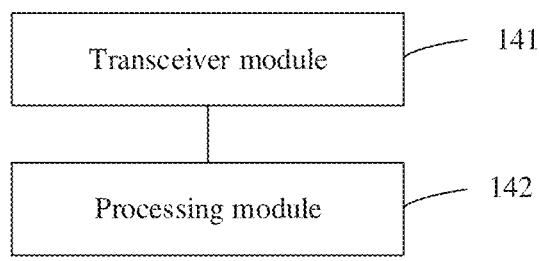
FIG. 14 is a schematic structural diagram of a function apparatus included in a terminal according to an embodiment of this application.

For example, the terminal 10 may implement corresponding functions by using function modules. As shown in FIG. 14, the terminal 10 may include a transceiver module 141 and a processing module 142.

In an embodiment, the terminal 10 may be configured to perform the incoming call alert method in any one of the embodiments shown in FIG. 12. An example is used as follows:

The transceiver module 141 is configured to receive an incoming call request. The processing module 142 is configured to invoke a player of a system to play audio/video corresponding to the incoming call request.

It can be learnt that the terminal 10 described in this embodiment of this application includes the audio/video player, so that when the terminal 10 receives the incoming call request, the terminal 10 does not need to invoke third-party video playing software to play the video. This can reduce occupied system resources.

Optionally, the processing module 142 is further configured to display a caller ID display interface and a video animation of the audio/video, where the animation of the audio/video is used as a background of the caller ID display interface.

Optionally, the transceiver module 141 is further configured to receive a storage instruction entered by a user. The processing module 142 is further configured to store a target audio/video file indicated by the storage instruction.

Optionally, the transceiver module 141 is further configured to receive an extension instruction entered by the user. The processing module 142 is further configured to display a control menu in response to the extension instruction, where the control menu includes a control corresponding to the storage instruction.

Optionally, the processing module 142 is configured to: obtain, from the storage instruction, an address of the target audio/video file in a server, where the server is a server of an application program APP for playing the target audio/video; obtain the target audio/video file based on the address; and store the target audio/video file locally.

Optionally, the processing module 142 is configured to store the target audio/video file in a system memory. Alternatively, in this embodiment, the processing module 142 is configured to store the target audio/video file in a cache memory 122 of the APP.

Optionally, the transceiver module 141 is further configured to receive a first setting instruction entered by the user, where the first setting instruction includes first contact information, the contact information includes a contact identifier and a contact group identifier, and the contact group identifier indicates a set including at least two contact identifiers. The processing module 142 is configured to display an audio/video file name list. In this embodiment, the transceiver module 141 is further configured to receive a first selection instruction entered by the user, where the first selection instruction includes a first audio/video file identifier. Correspondingly, the processing module 142 is further configured to establish a correspondence between the first audio/video file identifier and the first contact information.

Optionally, the transceiver module 141 is further configured to receive a second setting instruction entered by the user, where the second setting instruction includes a second audio/video file identifier. The processing module 142 is further configured to display a contact information list. In this embodiment, the transceiver module 141 is further configured to receive a second selection instruction entered by the user, where the second selection instruction includes second contact information. Correspondingly, the processing module 142 is further configured to establish a correspondence between the second audio/video file identifier and the second contact information.

Optionally, the transceiver module 141 is further configured to receive a third setting instruction entered by the user, where the third setting instruction includes an address of a third audio/video file in a server, and the server is a server of an APP for playing the target audio/video. The processing module 142 is configured to: obtain the third audio/video file based on the address and determine a third audio/video file identifier, and is further configured to display a contact information list. In this embodiment, the transceiver module 141 is further configured to receive a third selection instruction entered by the user, where the third selection instruction includes third contact information. Correspondingly, the processing module 142 is further configured to establish a correspondence between the third audio/video file identifier and the third contact information.

Optionally, the processing module 142 is further configured to obtain a contact identifier corresponding to the incoming call request. In another embodiment, the processing module 142 is further configured to determine an audio/video file identifier corresponding to the contact identifier.

Optionally, the processing module 142 is further configured to detect whether a correspondence between contact information and an audio/video file identifier includes the contact identifier. In addition, in response to the correspondence between contact information and an audio/video file identifier including the contact identifier, the processing module 142 is further configured to read the audio/video file identifier corresponding to the contact identifier. In response to the correspondence between contact information and an audio/video file identifier not including the contact identifier, the processing module 142 is further configured to: obtain a contact group identifier corresponding to the contact identifier, and read an audio/video file identifier corresponding to the contact group identifier.

In specific implementation, in correspondence to the terminal 10, an embodiment of this application further provides a computer storage medium. The computer storage medium disposed in any device may store a program. When the program is being executed, some or all steps in the embodiments including the incoming call alert method in FIG. 12 can be performed. The storage medium may be a magnetic disk, an optical disc, a read-only memory (ROM), a random access memory (RAM), or the like.

Persons skilled in the art may further learn that various illustrative logical blocks (illustrative logic block) and steps (step) that are listed in the embodiments of this application may be implemented by using electronic hardware, computer software, or a combination thereof. Whether the functions are implemented by using hardware or software depends on particular applications and a design requirement of the entire system. Persons of ordinary skill in the art may use various methods to implement the described functions for each particular application, but it should not be considered that the implementation goes beyond the protection scope of the embodiments of this application.

It should be understood that sequence numbers of the foregoing processes do not mean execution sequences in the embodiments of this application. The execution sequences of the processes should be determined based on functions and internal logic of the processes, and should not constitute any limitation on the implementation processes of the embodiments of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

Although example preferred embodiments of this application have been described, persons skilled in the art can make changes and modifications to these embodiments once they learn the basic inventive concept. Therefore, the following claims are intended to be construed as to cover the example preferred embodiments and all changes and modifications falling within the scope of the embodiments of this application.

Clearly, persons skilled in the art can make various modifications and variations to the embodiments of this application without departing from the spirit and scope of the embodiments of this application. The embodiments of this application are intended to cover these modifications and variations of the embodiments of this application provided that the modifications and variations fall within the scope of the claims of the embodiments of this application and their equivalent technologies.

What is claimed is:

1. An incoming call alert method performed by one or more processors of a terminal having a first subscriber identity (SIM) card and a second SIM card installed, the method comprises:
   setting a first video as an incoming call video of the first SIM card according to a first received input;
   setting a second video as an incoming call video of the second SIM card according to a second received input;
   receiving an incoming call request and identifying the first SIM card or the second SIM card as a target SIM card corresponding to the incoming call request; and,
   playing an incoming call video of the target SIM card in response to the incoming call request, wherein the incoming call video of the target SIM card comprises the first video or the second video.

2. The incoming call alert method according to claim 1, wherein the method further comprises:
   after said receiving the incoming call request, displaying a caller ID display interface, and using the incoming call video of the target SIM card as a background of the caller ID display interface.

3. The incoming call alert method according to claim 1, wherein the setting a first video as an incoming call video of the first SIM card according to a first user input comprises:
   displaying a first setting interface corresponding to the first SIM card, wherein the first setting interface comprises a first video list;
   determining a video selected by the user from the first video list as the first video; and,
   setting the first video as the incoming call video of the first SIM card.

4. The incoming call alert method according to claim 3, wherein the setting a second video as an incoming call video of the second SIM card according to a second user input comprises:
   displaying a second setting interface corresponding to the second SIM card, wherein the second setting interface comprises a second video list;
   determining a video selected by the user from the second video list as the second video; and
   setting the second video as the incoming call video of the second SIM card.

5. The incoming call alert method according to claim 1, wherein the playing an incoming call video of the target SIM card in response to the incoming call request comprises:
   playing, in response to the incoming call request, the incoming call video of the target SIM card by invoking an audio/video player of the terminal.

6. The incoming call alert method according to claim 5, wherein the method further comprises:
   after the receiving an incoming call request, invoking the audio/video player of the terminal to play an audio corresponding to the incoming call request.

7. The incoming call alert method according to claim 1, wherein the terminal is a smartphone.

8. A terminal configured to include a first subscriber identity (SIM) card and a second SIM card, and comprising a memory and at least one processor, the at least one processor configured to perform operations comprising:
  setting a first video as an incoming call video of the first SIM card according to a first user input;
  setting a second video as an incoming call video of the second SIM card according to a second user input;
  receiving an incoming call request and identifying the first SIM card or the second SIM card as a target SIM card corresponding to the incoming call request; and
  playing an incoming call video of the target SIM card in response to the incoming call request, wherein the incoming call video of the target SIM card comprises the first video or the second video.

9. The terminal according to claim 8, further comprising a display, wherein the at least one processor is further configured to, after said receiving the incoming call request, display a caller ID display interface on the display, and using the incoming call video of the target SIM card as a background of the caller ID display interface.

10. The terminal according to claim 8, further comprising a display, wherein the at least one processor is further configured to:
  display a first setting interface corresponding to the first SIM card, wherein the first setting interface comprises a first video list;
  determine a video selected by the user from the first video list as the first video; and,
  set the first video as the incoming call video of the first SIM card.

11. The terminal according to claim 10, wherein the at least one processor is further configured to:
  display a second setting interface corresponding to the second SIM card, wherein the second setting interface comprises a second video list;
  determine a video selected by the user from the second video list as the second video; and
  set the second video as the incoming call video of the second SIM card.

12. The terminal according to claim 8, wherein the playing an incoming call video of the target SIM card in response to the incoming call request comprises:
  playing, in response to the incoming call request, the incoming call video of the target SIM card by invoking an audio/video player of the terminal.

13. The terminal according to claim 12, wherein the at least one processor is further configured to, after the receiving an incoming call request, invoke the audio/video player of the terminal to play an audio corresponding to the incoming call request.

14. The terminal according to claim 8, wherein the terminal is a smartphone.

15. A non-transitory computer readable storage medium storing instructions which, when executed by one or more processors of a terminal comprising a first subscriber identity (SIM) card, a second SIM card and a memory, causes the terminal to perform operations comprising:
  setting a first video as an incoming call video of the first SIM card according to a first user input;
  setting a second video as an incoming call video of the second SIM card according to a second user input;
  receiving an incoming call request and identifying the first SIM card or the second SIM card as a target SIM card corresponding to the incoming call request; and
  playing an incoming call video of the target SIM card in response to the incoming call request, wherein the incoming call video of the target SIM card comprises the first video or the second video.

* * * * *